United States Patent
Jang et al.

(10) Patent No.: US 10,225,819 B2
(45) Date of Patent: Mar. 5, 2019

(54) WIRELESS RECEIVER AND CONTROL METHOD THEREOF

(71) Applicant: LG ELECTRONICS INC., Seoul (KR)

(72) Inventors: Yujune Jang, Seoul (KR); Jeongyoon Rhee, Seoul (KR); Taeseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/317,608

(22) PCT Filed: Jul. 14, 2014

(86) PCT No.: PCT/KR2014/006293
§ 371 (c)(1),
(2) Date: Dec. 9, 2016

(87) PCT Pub. No.: WO2015/190641
PCT Pub. Date: Dec. 17, 2015

(65) Prior Publication Data
US 2017/0118740 A1    Apr. 27, 2017

(30) Foreign Application Priority Data
Jun. 10, 2014 (KR) .................. 10-2014-0070298

(51) Int. Cl.
*H04W 68/08* (2009.01)
*H04B 1/06* (2006.01)
(Continued)

(52) U.S. Cl.
CPC .............. *H04W 68/08* (2013.01); *H04B 1/06* (2013.01); *H04B 1/385* (2013.01); *H04M 1/05* (2013.01);
(Continued)

(58) Field of Classification Search
CPC .... H04R 1/105; H04R 1/1033; H04R 1/1091; H04R 1/1041; H04R 1/1016; H04R 5/033;
(Continued)

(56) References Cited

U.S. PATENT DOCUMENTS

2004/0203506 A1* 10/2004 Gantz ................. H04M 1/6066 455/90.3
2004/0242264 A1* 12/2004 Cho .................... H04M 1/6066 455/550.1
(Continued)

FOREIGN PATENT DOCUMENTS

KR    10-2008-0041048 A    5/2008

*Primary Examiner* — Dinh Nguyen
(74) *Attorney, Agent, or Firm* — Birch, Stewart, Kolasch & Birch, LLP

(57) ABSTRACT

The present invention provides a wireless receiver and control method thereof capable of outputting a notification of an event that has occurred in a mobile terminal. To this end, a wireless receiver may comprise: an earphone; a sensing unit for detecting whether a user is wearing a wireless receiver; a short-range communication unit for communicating with a mobile terminal; and a control unit for, when an event has occurred in the mobile terminal and event occurrence notification information is received from the mobile terminal, controlling to output a feedback in response to the reception of the event occurrence notification information.

13 Claims, 33 Drawing Sheets

(51) Int. Cl.
*H04B 1/3827* (2015.01)
*H04M 1/60* (2006.01)
*H04M 1/725* (2006.01)
*H04M 1/05* (2006.01)
*H04R 1/10* (2006.01)
*H04R 5/033* (2006.01)
*H04W 4/80* (2018.01)

(52) U.S. Cl.
CPC ....... *H04M 1/6033* (2013.01); *H04M 1/6066* (2013.01); *H04M 1/7253* (2013.01); *H04R 1/1041* (2013.01); *H04W 4/80* (2018.02); *H04M 1/72558* (2013.01); *H04M 2250/02* (2013.01); *H04R 1/1016* (2013.01); *H04R 1/1033* (2013.01); *H04R 5/033* (2013.01); *H04R 5/0335* (2013.01); *H04R 2420/07* (2013.01)

(58) Field of Classification Search
CPC . H04R 5/0335; H04R 2420/07; H04W 68/08; H04W 4/008; H04W 4/80; H04B 1/385; H04B 1/06; H04M 1/6033; H04M 1/7253; H04M 1/05; H04M 1/6066; H04M 1/72558; H04M 2250/02
See application file for complete search history.

(56) References Cited

U.S. PATENT DOCUMENTS

| | | | |
|---|---|---|---|
| 2006/0109201 A1* | 5/2006 | Ryoo | G06F 3/016 345/8 |
| 2006/0251282 A1* | 11/2006 | Kaoh | H04R 1/1016 381/381 |
| 2007/0281614 A1* | 12/2007 | Oliver | H04B 1/3805 455/41.2 |
| 2007/0293287 A1* | 12/2007 | Yu | H04M 1/6066 455/575.2 |
| 2008/0220831 A1* | 9/2008 | Alameh | H04M 1/6066 455/575.2 |
| 2008/0247562 A1 | 10/2008 | Nagayasu et al. | |
| 2008/0260176 A1* | 10/2008 | Hollemans | H04R 1/1041 381/74 |
| 2009/0028356 A1* | 1/2009 | Ambrose | H04R 1/1091 381/71.6 |
| 2009/0097689 A1* | 4/2009 | Prest | H04R 1/028 381/380 |
| 2009/0131764 A1* | 5/2009 | Lee | A61B 5/0205 600/301 |
| 2010/0308999 A1 | 12/2010 | Chornenky | |
| 2011/0132378 A1 | 6/2011 | Levendowski et al. | |
| 2011/0144779 A1* | 6/2011 | Janse | G11B 20/10009 700/94 |
| 2013/0094659 A1* | 4/2013 | Liu | H04R 1/10 381/74 |

* cited by examiner

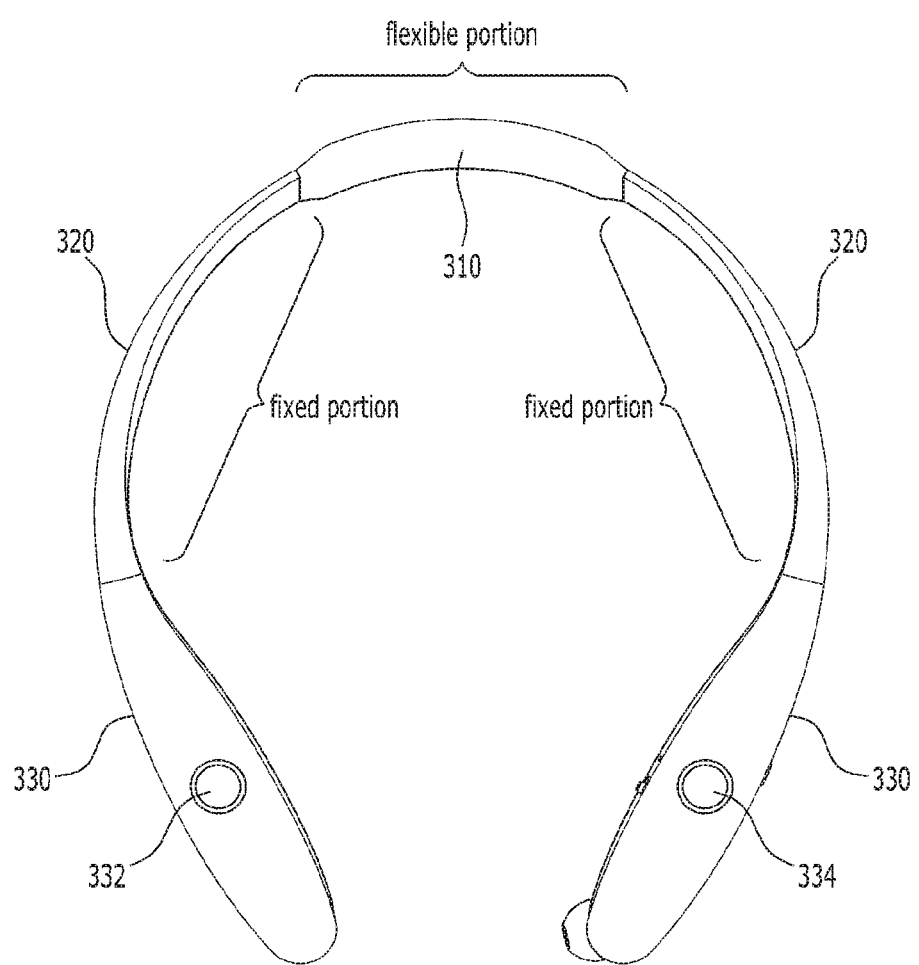

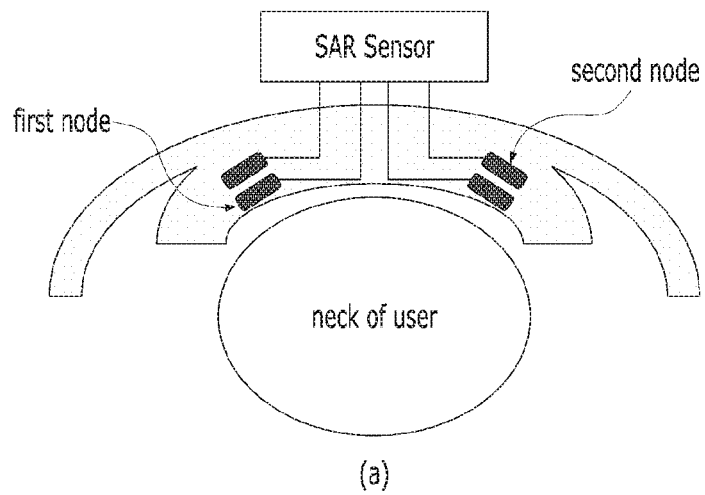

(a)

| Node recognition sensitivity level | distance with dielectric | remarks |
|---|---|---|
| very strong | very short | wearing wireless receiver (on skin) |
| strong | short | wearing wireless receiver (on thin cloth) |
| weak | long | wearing wireless receiver (on thick cloth) |
| very weak | very long | not wearing wireless receiver |

(b)

| Node1 recognition sensitivity level | Node2 recognition sensitivity level | remarks |
|---|---|---|
| high | low | Head set is inclined to left side |
| low | high | Head set is inclined to right side |

(c)

wireless receiver non-wearing state ->
vibration output level is high
(a)

wireless receiver wearing state ->
vibration output level is low
(b)

FIG. 11B
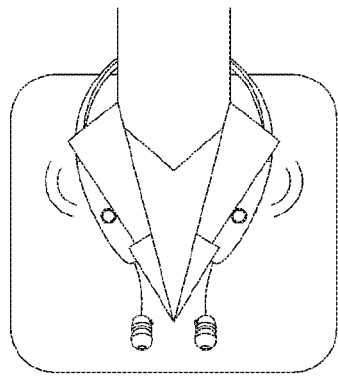
wireless receiver is worn on thick cloth -><br>
vibration output of first level
(a)
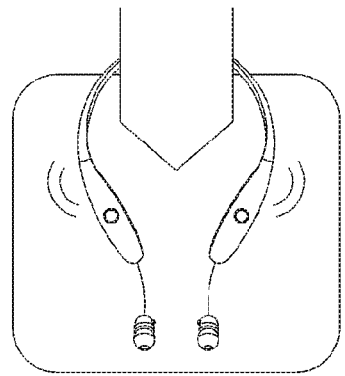
wireless receiver is worn on thin cloth -><br>
vibration output of second level (< first level)
(b)
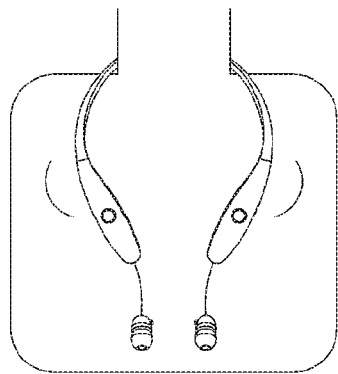
wireless receiver is worn on skin -><br>
vibration output of third level (< second level)
(c)

FIG. 12
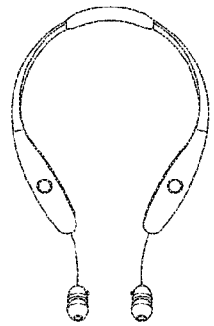
wireless receiver non-wearing state -> volume is high
(a)
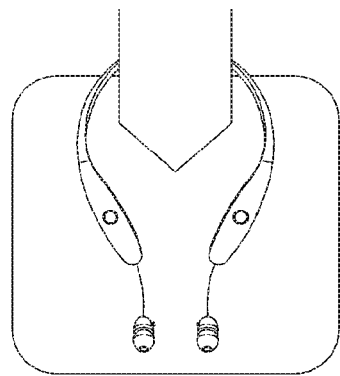
i) wireless receiver wearing state -> volume is low
ii) earphone non-wearing state -> volume setup to first level
(b)
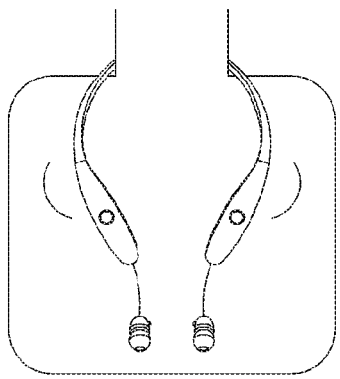
i) wireless receiver wearing state -> volume is low
ii) earphone wearing state -> volume setup to second level (< first level)
(c)

wireless receiver non-wearing state -> vibration output
(a)

wireless receiver and earphone wearing state -> simultaneous output of vibration and sound volume is low
(b)

FIG. 17
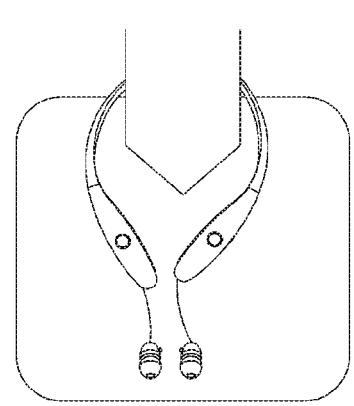
wireless receiver tightens neck of user
(a)
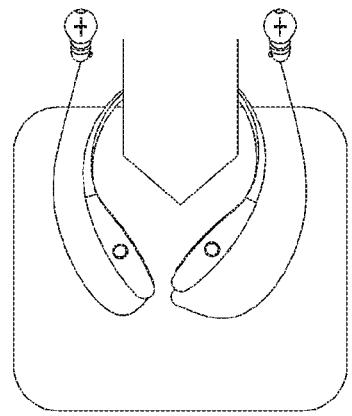
earphone is swollen
(b)

FIG. 18
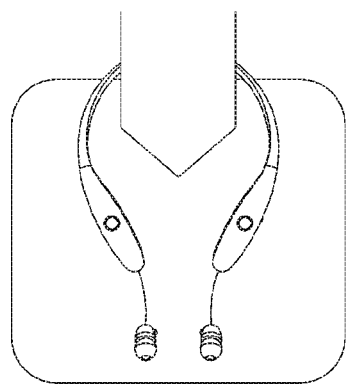
(a)
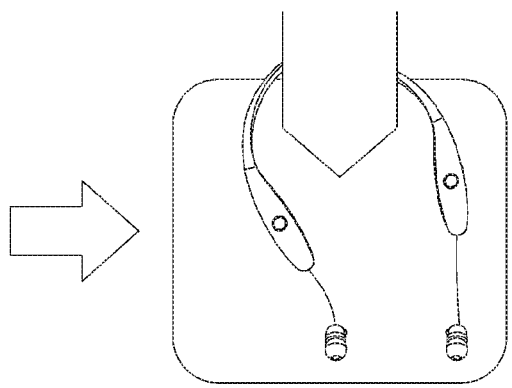
wireless receiver is inclined to one side
(b)
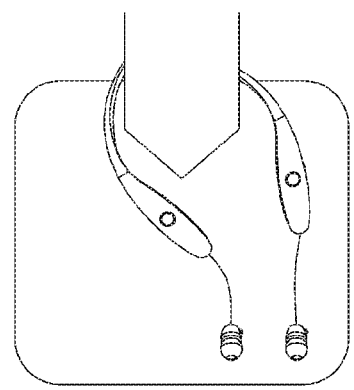
wireless receiver tightens neck of user
(c)

external noise of predetermined level or more is input
(a)

earphone is shrunk
(b)

WIRELESS RECEIVER AND CONTROL METHOD THEREOF

CROSS REFERENCE TO RELATED APPLICATIONS

This application is the National Phase of PCT International Application No. PCT/KR2014/006293, filed on Jul. 14, 2014, which claims priority under 35 U.S.C. 119(a) to Patent Application No. 10-2014-0070298, filed in the Republic of Korea on Jun. 10, 2014, which is hereby expressly incorporated by reference into the present application.

TECHNICAL FIELD

The present invention related to a wireless receiver capable of outputting a notification of an event that has occurred in a mobile terminal, and a control method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

For support and increase of the diversified functions of the mobile terminal, improvement of a structural portion and/or software portion of the mobile terminal may be considered.

If an earphone is connected to the mobile terminal, a user may listen to audio data, which are generated from the mobile terminal, alone. However, if a wired earphone is connected to the mobile terminal, it is burdensome, and it is not easy to manage the earphone, whereby a wireless receiver based on short-range communication has been widely used. Examples of the wireless receiver, which is most widely used up to now, include a Bluetooth earphone and a Bluetooth headset.

However, such a wireless receiver only serves to output audio data of multimedia files such as music or moving pictures provided from the mobile terminal. In this respect, various methods for improving convenience of a user who wears a wireless receiver by increasing functions of the wireless receiver have been discussed.

SUMMARY OF THE INVENTION

An object of the present invention is to provide a wireless receiver in which user convenience is improved, and a control method thereof.

In more detail, another object of the present invention is to provide a wireless receiver capable of outputting a feedback corresponding to event occurrence if an event occurs in a mobile terminal, and a control method thereof.

Moreover, other object of the present invention is to provide a wireless receiver capable of properly controlling output intensity of a feedback to adapt to a wireless receiver wearing state of a user and a control method thereof.

It will be appreciated by persons skilled in the art that the objects that could be achieved with the present invention are not limited to what has been particularly described hereinabove and the above and other objects that the present invention could achieve will be more clearly understood from the following detailed description.

To achieve the above objects, according one aspect of the present invention, a wireless receiver, which controls output intensity of a feedback, comprises an earphone; a sensing unit for sensing whether a user wears the wireless receiver; a short-range communication unit for communicating with a mobile terminal; a controller for outputting the feedback in response to reception of event occurrence notification information if the event occurrence notification information is received from the mobile terminal as an event occurs in the mobile terminal. In this case, the controller may control the output intensity of the feedback depending on whether the user wears the wireless receiver.

Also, in another aspect of the present invention, a control method of a wireless receiver, which controls output intensity of a feedback, comprises the steps of receiving event occurrence notification information from a mobile terminal if an event occurs in the mobile terminal; and outputting the feedback in response to reception of the event occurrence notification information. In this case, the output intensity of the feedback may be controlled depending on whether the user wears the wireless receiver.

It will be appreciated by persons skilled in the art that the technical solutions that could be achieved with the present invention are not limited to what has been particularly described hereinabove and the above and other solutions that the present invention could achieve will be more clearly understood from the following detailed description.

Advantageous effects of a mobile terminal and a control method thereof according to the present invention are as follows.

According to at least one of the embodiments of the present invention, it is advantageous that a wireless receiver in which user convenience is improved and a control method thereof can be provided.

According to at least one of the embodiments of the present invention, if an event occurs in the mobile terminal, it is advantageous that a wireless receiver capable of outputting a feedback corresponding to the event occurrence and a control method thereof can be provided.

Additionally, according to at least one of the embodiments of the present invention, it is advantageous that a wireless receiver capable of properly controlling output intensity of a feedback in response to a wireless receiver wearing state of a user and a control method thereof can be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

FIGS. 1*a* and 1*c* are conceptual views of one example of the mobile terminal, viewed from different directions

FIGS. 3*a* and 3*b* are views illustrating a wireless receiver viewed from a front surface and a rear surface, respectively.

FIG. 8 is a view illustrating an example of determining whether a user wears a wireless receiver by using an SAR sensor.

FIGS. 11*a* and 11*b* are views illustrating an example that vibration output intensity is controlled.

FIG. 12 is a view illustrating an example that a volume is controlled.

FIG. 17 is a view illustrating an operation of a wireless receiver when a user moves violently.

FIG. 18 is a view illustrating an example that a wireless receiver tightens a neck of a user.

DETAILED DESCRIPTION OF THE EMBODIMENTS OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
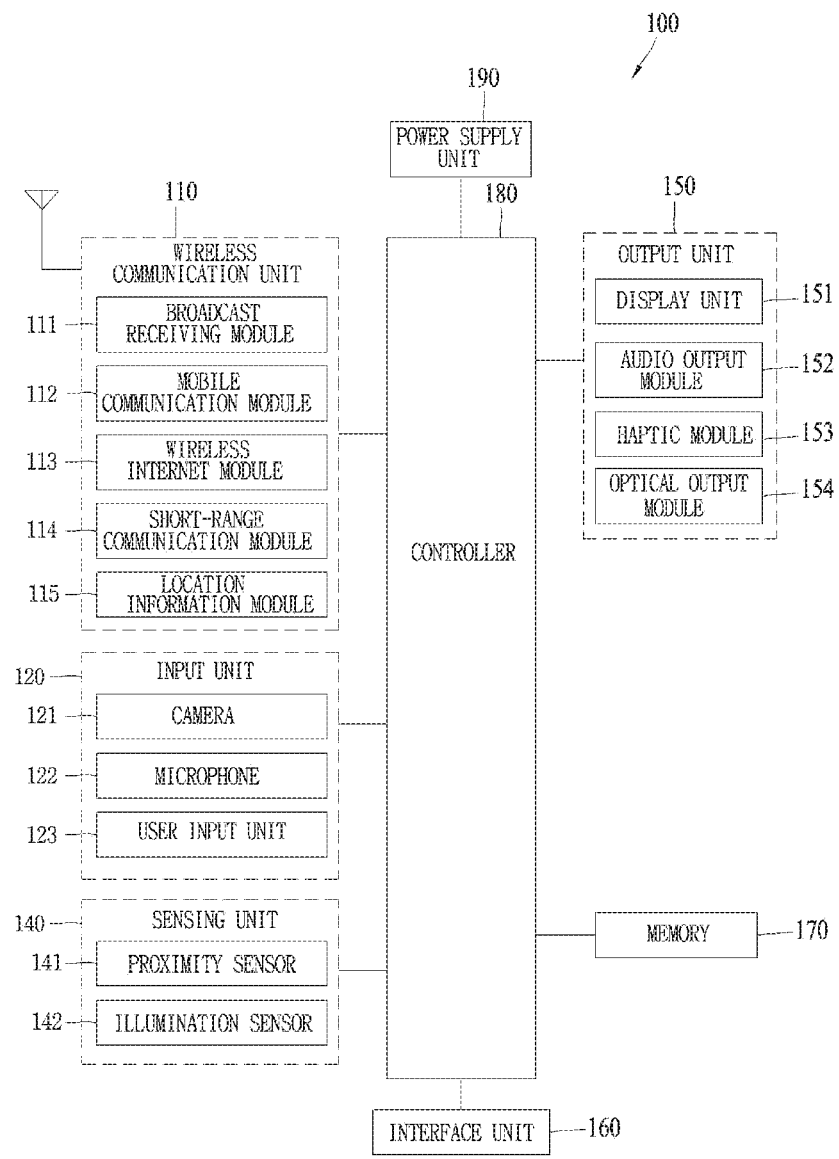
FIG. 1a is a block diagram of a mobile terminal in accordance with the present disclosure.
Figure 1B:
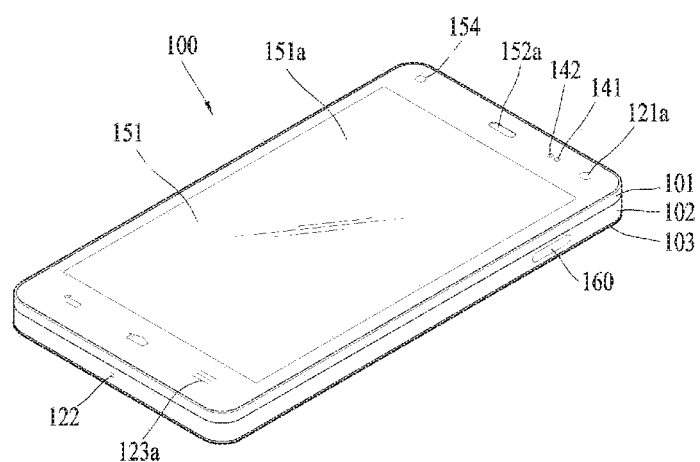
Figure 1C:
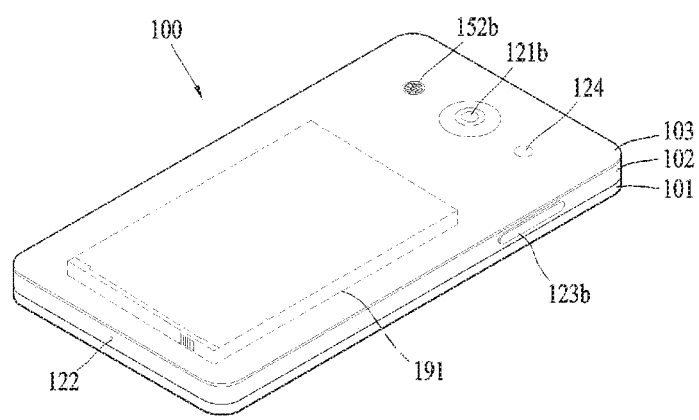

Reference is now made to FIGS. 1*a*-1*c*, where FIG. 1*a* is a block diagram of a mobile terminal in accordance with the present disclosure, and FIGS. 1*b* and 1*c* are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1a, or activating application programs stored in the memory 170.

As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the aforementioned components may be operated in cooperation with each other to implement the operation, control or control method of the mobile terminal according to various embodiments which will be described hereinafter. Also, the operation, control or control method of the mobile terminal may be implemented on the mobile terminal by driving of at least one application program stored in the memory 170.

The mobile terminal 100 described with reference to FIGS. 1 to 1c may be connected with the wireless receiver 200. The wireless receiver 200 may receive audio data and output the received audio data. Also, the wireless receiver 200 may output a feedback indicating occurrence of an event in the mobile terminal. In this case, the feedback may have, but not limited to, a type of audio or vibration.

If the wireless receiver 200 outputs the audio data, the controller 180 may control the audio output unit and the wireless receiver 200 to simultaneously output the audio data through the audio output unit and the wireless receiver 200, or may control the audio output unit and the wireless receiver 200 to output the audio data from the wireless receiver 200 only. The wireless receiver 200 will be described in detail with reference to the following drawings.

Figure 2:
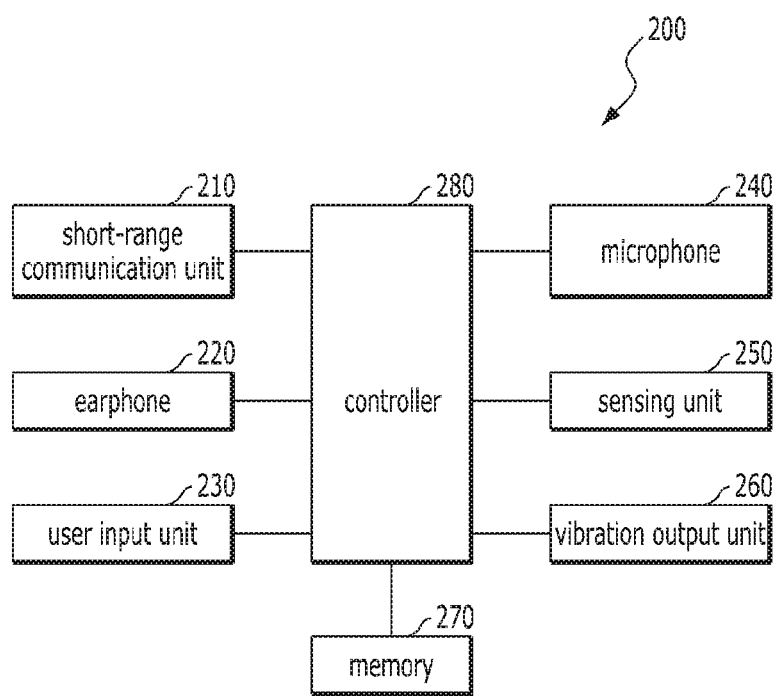
FIG. 2 is a block diagram illustrating a wireless receiver.

FIG. 2 is a block diagram illustrating a wireless receiver. Referring to FIG. 2, the wireless receiver 200 may include a short-range communication unit 210, an earphone 220, a user input unit 230, a microphone 240, a sensing unit 250, a vibration output unit 260, a memory 270, and a controller 280.

The short-range communication unit 210 is to perform wireless communication with the mobile terminal 100. Bluetooth may be applied between the wireless receiver 200 and the mobile terminal 100. In this case, the wireless receiver 200 and the mobile terminal 100 may mutually be connected with each other through pairing. Of course, other short-range communication technologies as well as Bluetooth technology may be applied between the wireless receiver 200 and the mobile terminal 100.

The earphone 220 may output audio data received from the mobile terminal 100. The wireless receiver 200 may be provided with a pair of left and right earphones 220, or may be provided with one earphone 220 at any one of left and right sides. The controller 280 may transmit audio data, which will be output from the earphone 220, through a cable connected to the earphone 220.

The user input unit 230 serves to generate an input signal as a user input is received. For example, the user input unit 230 may include a play control button for playing audio file such as music or moving picture or controlling pause, a call button for receiving an incoming call in the mobile terminal 100, a volume button for controlling a volume, and a power button for controlling on/off of the wireless receiver 200. The user input unit 230 may have a button shape that may be pushed by a user, and may include a touch sensor that may sense a touch of a user.

The microphone 240 may receive sound of a user. If the mobile terminal 100 is receiving a call, the user may perform the call by inputting voice through the microphone 240. The controller 280 may generate a control command for remotely controlling the mobile terminal 100 on the basis of the user voice input to the microphone 240. Also, the controller 280 may measure intensity of external noise through the microphone 240.

The sensing unit 250 may sense a state change of the wireless receiver 200. As a detailed example, the sensing unit 250 may sense a pressure applied to the wireless receiver 200, movement of the wireless receiver 200, and may generate a sensing signal.

The vibration output unit 260 serves to output vibration. As a detailed example, if an event occurs in the mobile terminal 100, the vibration output unit 260 may output vibration. At least one of intensity and length of vibration output through the vibration output unit 260 may be controlled under the control of the controller 280.

The memory 270 may store a program for an operation of the controller 280, and may temporarily store input/output data (for example, audio data received from the mobile terminal 100 or control command generated by the controller 280). The memory 270 may store data on various control commands which will be generated when the user input is received.

The controller 280 controls a whole operation of the wireless receiver 200. As a detailed example, the controller 280 may decode audio data received from the mobile terminal 100 and output the decoded data through the earphone 220. If an event such as message reception or call signal reception occurs in the mobile terminal 100, the controller 280 may output a feedback such as vibration. Also, the controller 280 may generate a control signal based on the input signal generated from the user input unit 230 and transmit the generated control signal to the mobile terminal 100. The controller 280 may sense a gesture input based on the sensing signal of the sensing unit 250 and generate a control signal based on the gesture input.

Figure 3B:
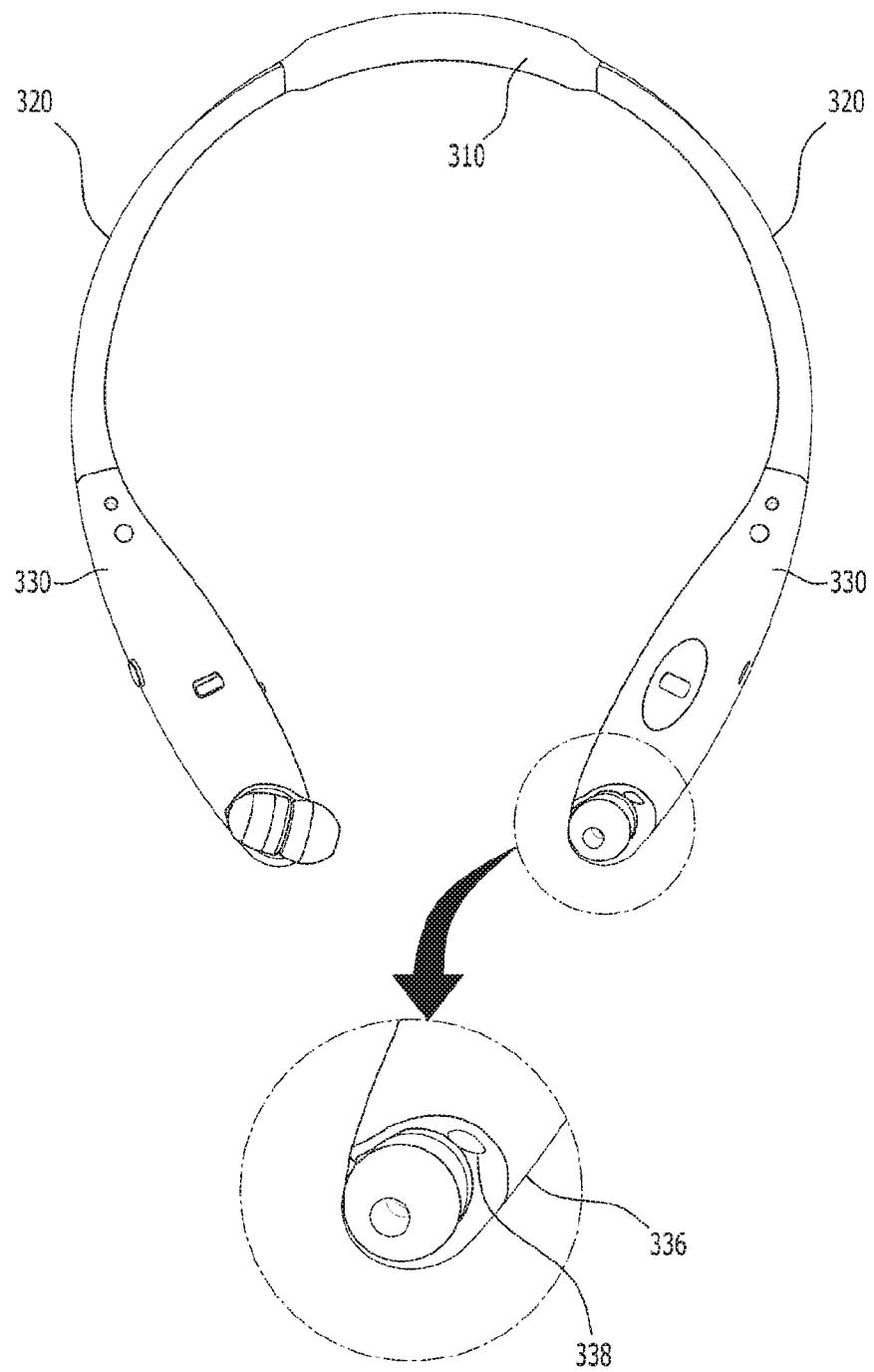
Figure 3C:
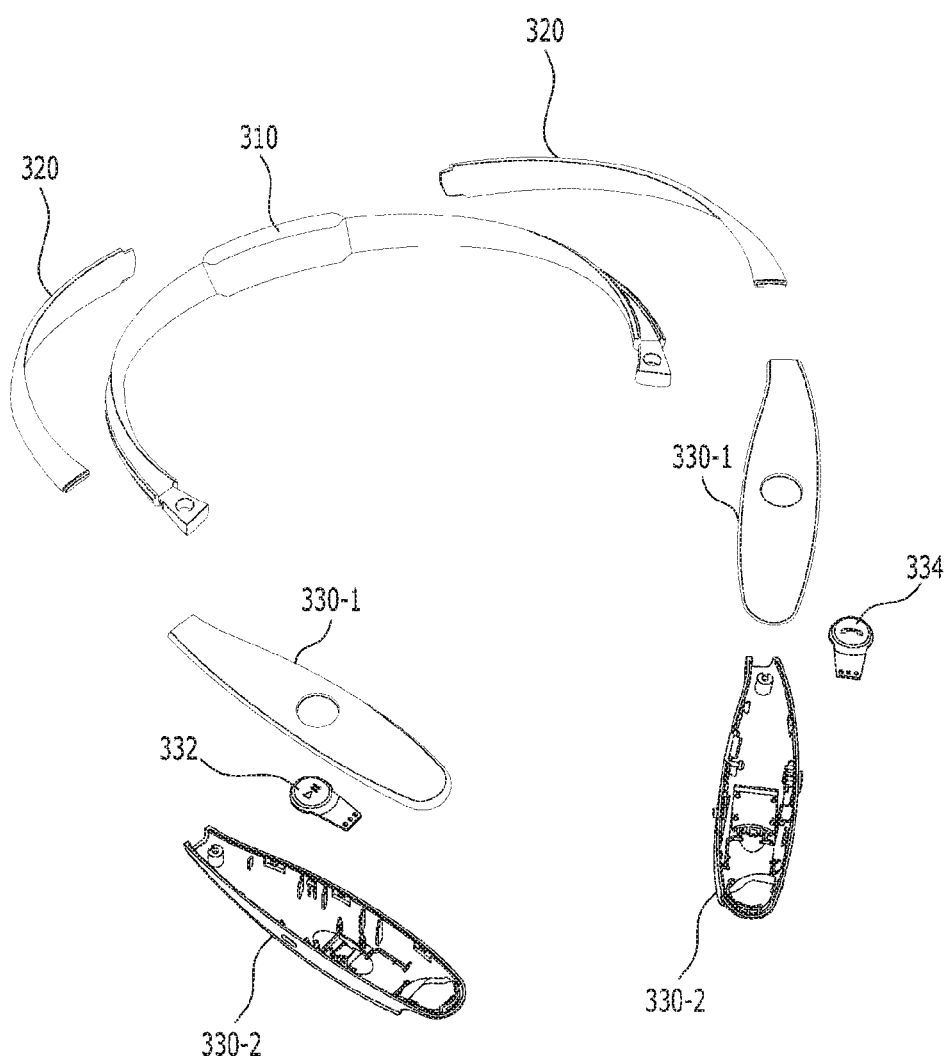
FIG. 3*c* is an exploded perspective view illustrating a wireless receiver.

FIGS. 3a and 3b are views illustrating a wireless receiver viewed from a front surface and a rear surface, respectively, and FIG. 3c is an exploded perspective view illustrating a wireless receiver. The wireless receiver 200 may have a circular shape which is partially opened. Therefore, the user may use the wireless receiver 200 by hanging the wireless receiver 200 on a neck through the opened space.

Referring to FIGS. 3a to 3c, the wireless receiver 200 may include a band frame 310, a pair of left and right fixed frames 320 and a pair of left and right main bodies 330.

The band frame 310 constitutes a frame of the wireless receiver 200, and may have a curved line shape of which one side is opened to allow the wireless receiver 200 to have a circular shape that may be worn on a neck of a user. The band frame 310 may be formed of a flexible material that may be curved or bent at a certain level. As such an example, the band frame 310 may be formed of a material such as leather, rubber, silicon, and synthetic resin.

If all portions of the band frame 310 are freely curved or bent, the shape of the wireless receiver 200 is not maintained uniformly, whereby inconvenience may be caused to a user who wears the wireless receiver 200. Therefore, the fixed frames 320 may be coupled to a part of a left side and a part of a right side of the left frame of the band frame 310.

The fixed frames 320 may be formed of a synthetic resin or metal (for example, stainless steel (STS), Al, Ti, etc.) which is not deformed easily even though an external force is applied thereto. Therefore, the portion where the band frame 310 and the fixed frame 320 are coupled to each other may have its original shape without being deformed even though an external force is applied thereto.

However, it is not preferable that all portions of the band frame 310 are coupled to the fixed frame 320. As all portions of the band frame 310 are coupled to the fixed frame 320, if all portions of the band frame 310 are not deformed even though an external force is applied to all portions of the band frame 310, a size of the opened space formed to be worn on a neck of a user will not be changed. Therefore, a problem occurs in that a user whose neck is thick cannot use the wireless receiver 200 by hanging the wireless receiver 200 on his/her neck.

In this respect, at least a part of the band frame 310 is not coupled to the fixed frame 320, whereby the size of the opened area should be enlarged at a certain level. To this end, as shown in FIGS. 3a and 3b, a part of the left side and a part of the right side of the band frame 310 are configured to be coupled to a pair of fixed frames 320, and a center part of the band frame 310 may be configured so as not to be coupled to the fixed frame 320. As a result, the center part of the band frame 310 may easily be bent, whereby a distance between a pair of the main bodies 330 connected with the band frame 310 may be increased or decreased.

For convenience of description, the portion where the fixed frame 320 and the band frame 310 are coupled to each other will be referred to as a fixed portion, and the center part of the band frame 310 which is not coupled with the fixed frame 320 will be referred to as a flexible portion. Therefore, it may be understood that the frame of the wireless receiver 200 is formed by a pair of fixed and flexible portions.

However, the fixed portion and the flexible portion may be configured differently from the example shown in FIGS. 3a to 3c. For example, the fixed portion and the flexible portion may be configured by arranging an object of low rigidity of a flexible material at the center and connecting an object of high rigidity, which is not deformed easily, to both sides of the flexible material.

Referring to FIGS. 3a to 3c again, the main body 330 may be connected to one end of the fixed portion. The main body 330 may include a top cover 330-1 and a bottom cover 330-2. The electronic components, such as the short-range communication unit 210, the earphone 220 (specifically, wire), the user input unit 230, the sensing unit 250, the memory 270, the microphone 240 and the controller 280, which are described with reference to FIG. 2, may be packaged between the top cover 330-1 and the bottom cover 330-2.

The main body 330 may be provided with a button that may be pushed or touched by a user. For example, FIGS. 3a and 3c illustrate that circular buttons 332 and 334 are exposed to the top cover 330-1 of the right side main body 330 and the right side main body 330. Any one of the circular buttons 332 and 334 may serve as the play control button 332 for controlling a play of a multimedia file, and the other one may serve as the call button 334 for call connection.

The user may play or stop a multimedia file on the mobile terminal 100 by manipulating the play control button 332, and may receive or reject a call by using the call button 334. For example, simple once push of the call button in a state that a call is received in the mobile terminal 100 may be intended to receive the call, or may be intended to reject the call if a predetermined time passes in a state that the call button is pushed.

A receiving groove 336 for receiving the earphone 220 may be formed at one side of the main body 330. The receiving groove 336 is shown in FIG. 3b. A hole 338 may be formed in the receiving groove 336, and a cable connected with the earphone 220—may be inserted into or ejected from the main body 330 through the hole 338.

The main body 330 may include a cable winder for winding the cable of the earphone 220 and a motor for rotating the cable winder. Also, a button for driving the electronic motor may be exposed to the outer surface of the main body 330.

Figure 4:
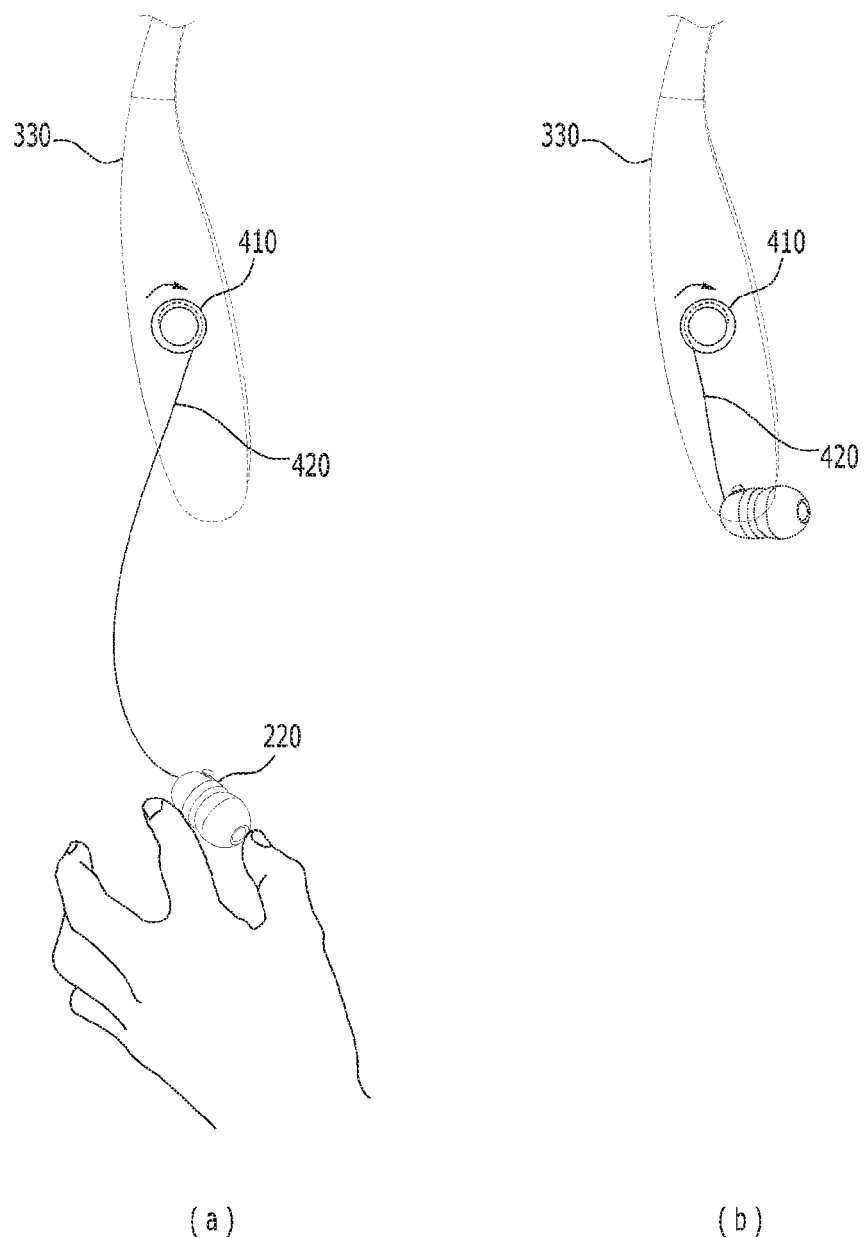
FIG. 4 is a view illustrating an example of winding a cable of an earphone by rotating a cable winder.

For example, FIG. 4 is a view illustrating an example of winding the cable of the earphone by rotating the cable winder. The cable 420 connected with the earphone 220 may be connected to the cable winder 410. If the user applies an external force for extracting the earphone 220, the cable winder 410 may be rotated in a first direction as shown in FIG. 4(a) to unwind the cable 420 wound in the cable winder 410.

Unlike this, if a user input for driving the electronic motor is received, the electronic motor may wind the cable 420 which is unwound in the cable winder 410 by rotating the cable winder 410 in a second direction. Therefore, when the earphone 220 is not used, the cable 420 may be received in the main body 330, whereby inconvenience in use of the wireless receiver 200 may be reduced.

The wireless receiver 200 may tighten a nape of a neck of a user who wears the wireless receiver 200. In more detail, as a distance between both ends of the main body 330 becomes short, the tightening operation of the nape of the neck of the user who wears the wireless receiver 200 may be performed.

Figure 5A:
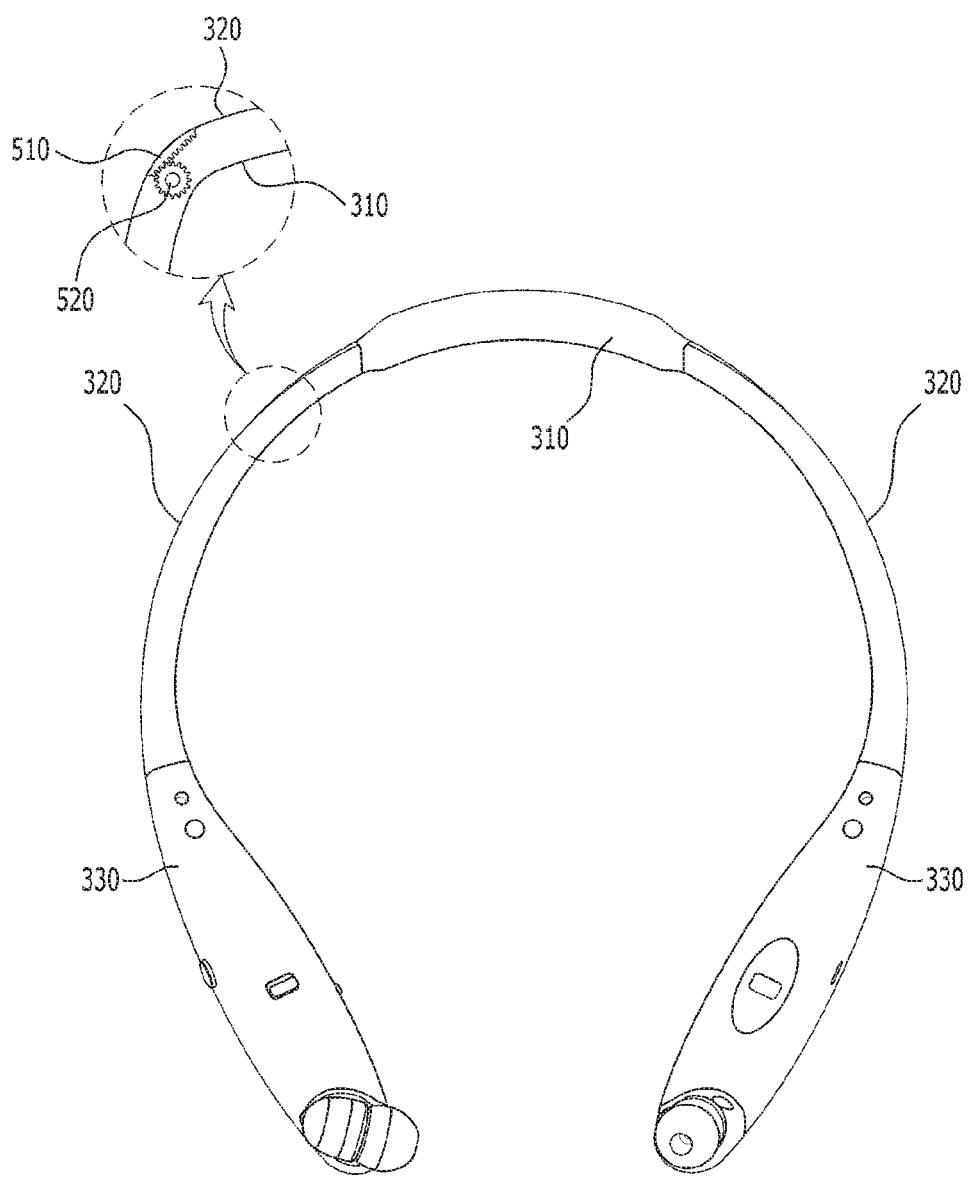
FIGS. 5*a* and 5*b* are views illustrating an example of performing an operation for tightening a nape of a neck of a user who wears a wireless receiver.
Figure 5B:
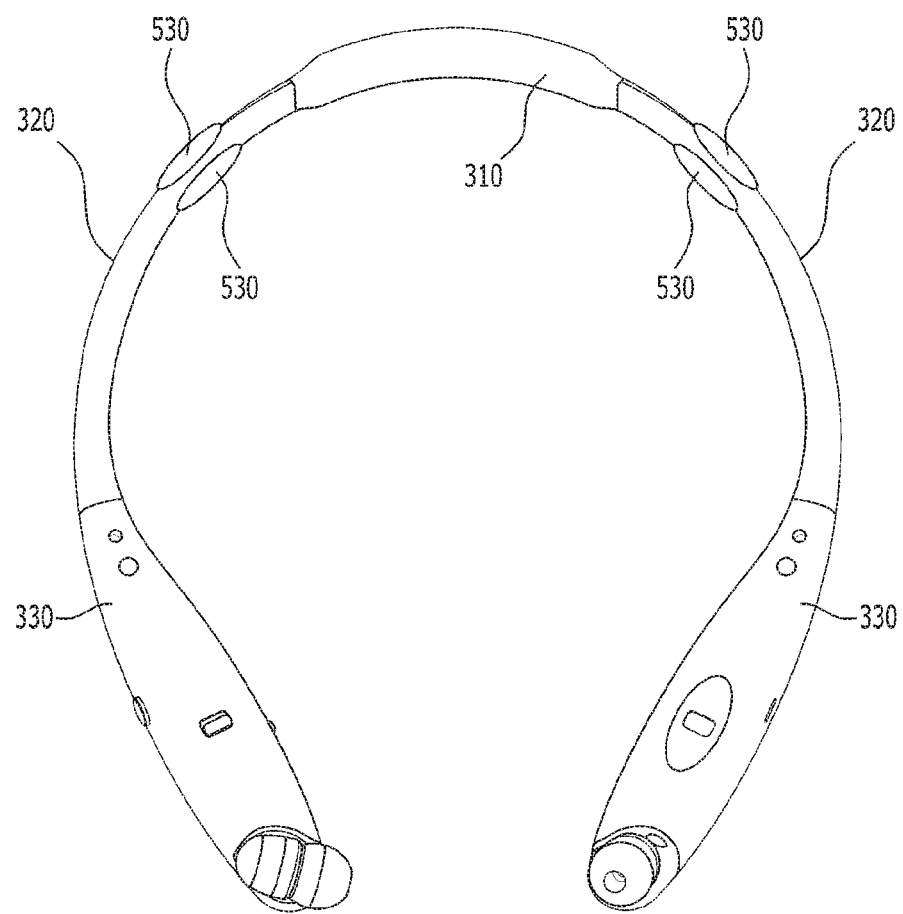

For example, FIGS. 5a and 5b illustrate an example that the tightening operation of the nape of the neck of the user who wears the wireless receiver 200 is performed.

As shown in FIG. 5a, a gear rack 510 may be inserted between the band frame 310 and the fixed frame 320. As shown in FIG. 5a, if the rack 510 is attached to the fixed frame 320, the fixed frame 320 may move toward an inner side of a circle, which is formed by the band frame 310, by means of rotation of a pinion gear 520. Therefore, the main body 330 connected to the fixed frame 320 and the band frame may move toward the inner side of the circle, whereby the wireless receiver 200 may tighten the nape of the user's neck.

If the pinion gear 520 is rotated reversely, the wireless receiver 200 may release the tightening operation of the nape of the user's neck.

Although not shown, an electronic motor for rotating the pinion gear 520 may be included, and may be operated under the control of the controller 280.

For another example, as shown in FIG. 5b, electroactive polymer material 530 may be deposited at both sides of the wireless receiver 200. The electroactive polymer material 530 is a material elongated or shrunk as an electric signal is applied thereto, and the controller 280 may control the wireless receiver 200 to tighten the nape of the user's neck by controlling whether to apply an electric signal to the electroactive polymer material 530. In FIG. 5b, the electroactive polymer material is deposited at both sides of the wireless receiver 200, one surface of the band frame 310 and one surface of the fixed frame 320. However, the deposition location of the electroactive polymer material 530 is not limited to the shown example.

The electroactive polymer material 530 may be deposited on the earphone 220 of the wireless receiver 200. Therefore, controller 280 may swell or shrink the earphone 220 by controlling whether to apply an electric signal to the polymer material 530. For example, if the controller 280 determines that the user wears the earphone 220, the controller 280 swells the earphone 220 to allow the earphone 220 not to be extracted from ears of the user, and if the controller 280 determined that the user does not wear the earphone 220, the controller 280 may shrink the earphone 220 to allow the user to easily put the earphone on his/her ears.

Figure 6:
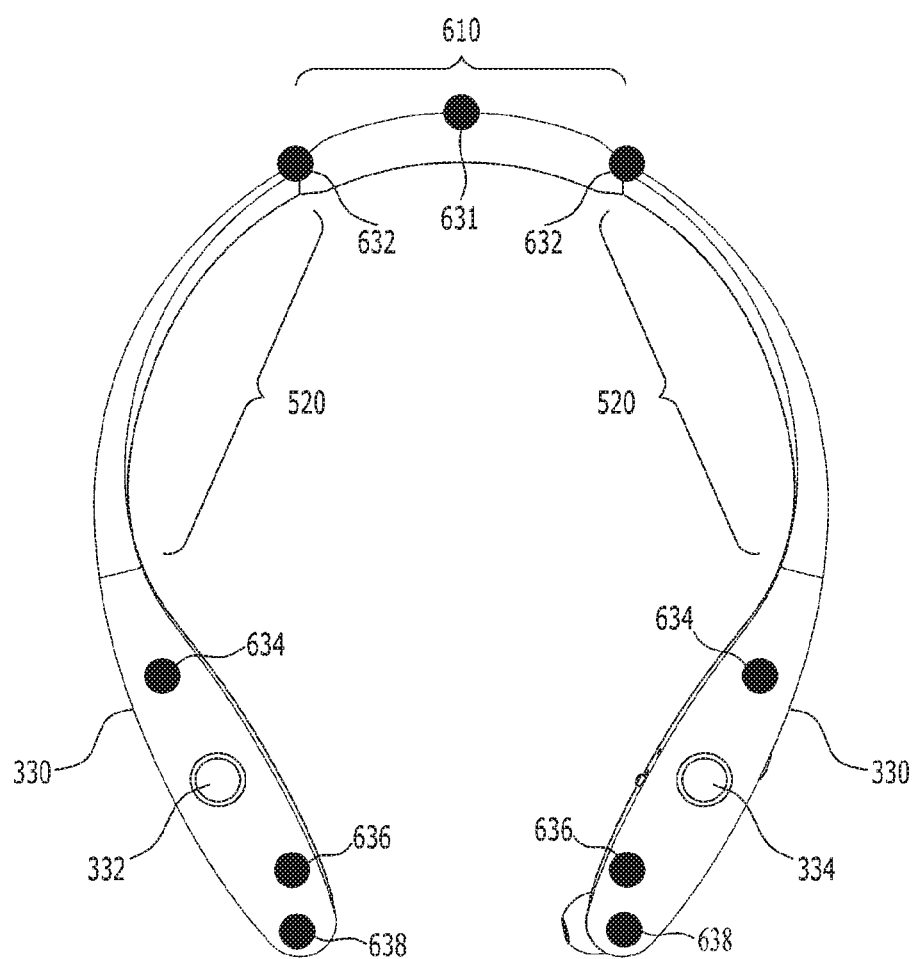
FIG. 6 is a view illustrating a sensor provided in a wireless receiver.

The wireless receiver 200 may include various sensors. For example, FIG. 6 is a view illustrating a sensor provided in a wireless receiver. First of all, a sensor 631 such as a pressure sensor, a touch sensor, and a proximity sensor may be installed in a flexible portion (that is, a part of the band frame 310 which is not coupled to the fixed frame 320) of the wireless receiver 200. If a pressure is applied to the flexible portion 610 based on the sensor installed in the flexible portion 610, whether a pointer (for example, finger or palm of a user) has been touched the flexible portion 610 or has approached the flexible portion 610 may be sensed.

A sensor 632 such as a touch sensor and a proximity sensor may be installed at the boundary between the flexible portion 610 and the fixed portion (that is, a part of the band frame 310 coupled to the fixed frame 320). Based on the sensor 632 installed between the flexible portion 610 and a fixed portion 620, whether a pointer has been touched the flexible portion 610 or has approached between the flexible portion 610 and the fixed portion 620 may be sensed.

A sensor 634 such as a gyro sensor and an acceleration sensor may be included in the fixed frame 320. Based on the sensor included in the fixed frame 320, movement of the main body 330 and twist of the main body 330 may be sensed.

A sensor 636 such as a magnet sensor may further be included in the fixed frame 320. This sensor may serve to sense whether the earphone 220 has been received in the receiving groove 336. To this end, the sensor 636 may preferably be disposed near the receiving groove 336. Also, a magnet should be installed in the earphone 220 for combination with the magnet sensor.

A sensor 638 such as a touch sensor and a proximity sensor may be installed at the end of the fixed frame 320. Based on the sensor 638 installed at the end of the fixed frame 320, whether a pointer has been touched the end of the fixed frame 320 or has approached the fixed frame 320 may be sensed.

Figure 7A:
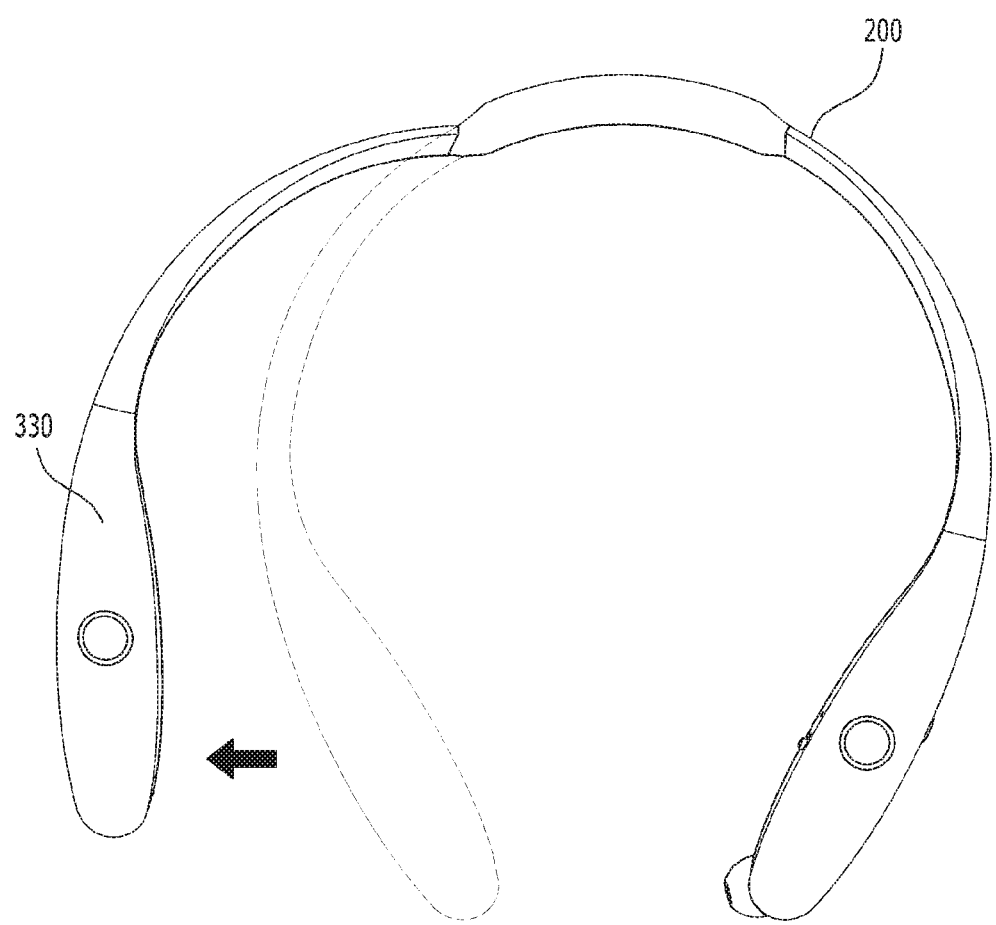
FIGS. 7*a* to 7*j* are views illustrating input examples of various gestures.
Figure 7B:
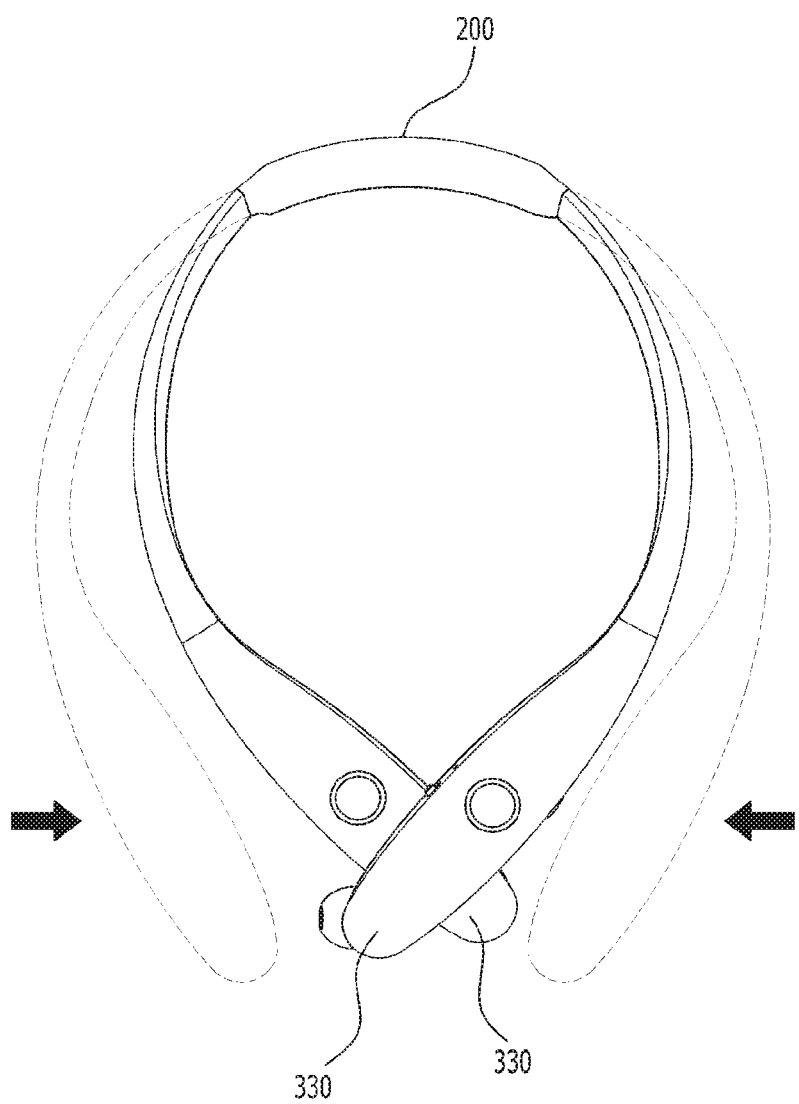
Figure 7C:
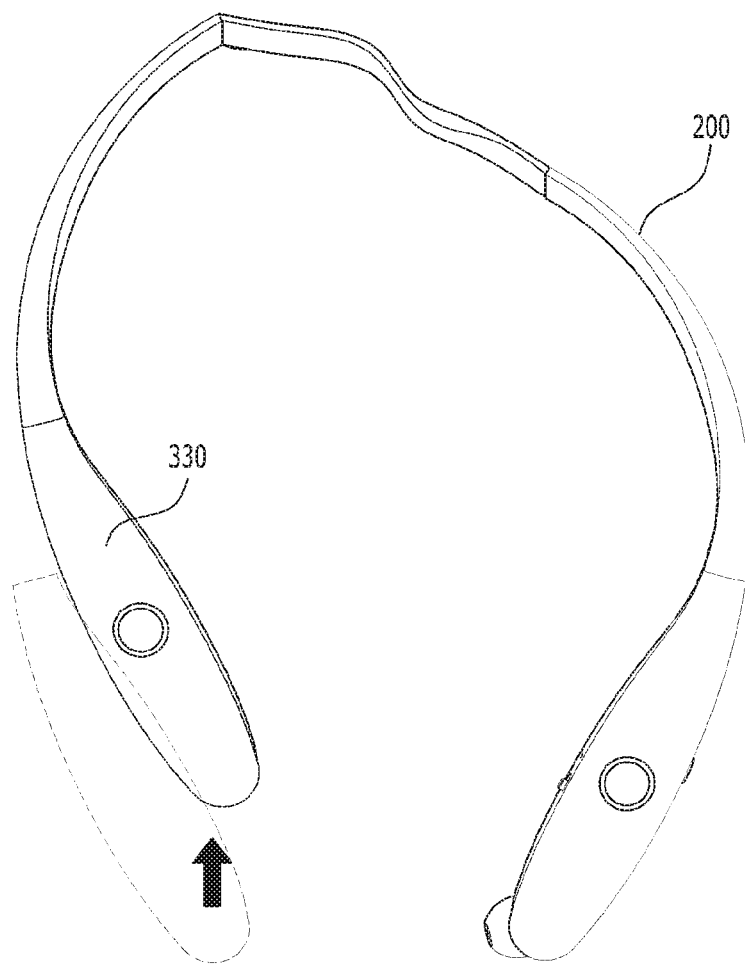
Figure 7D:
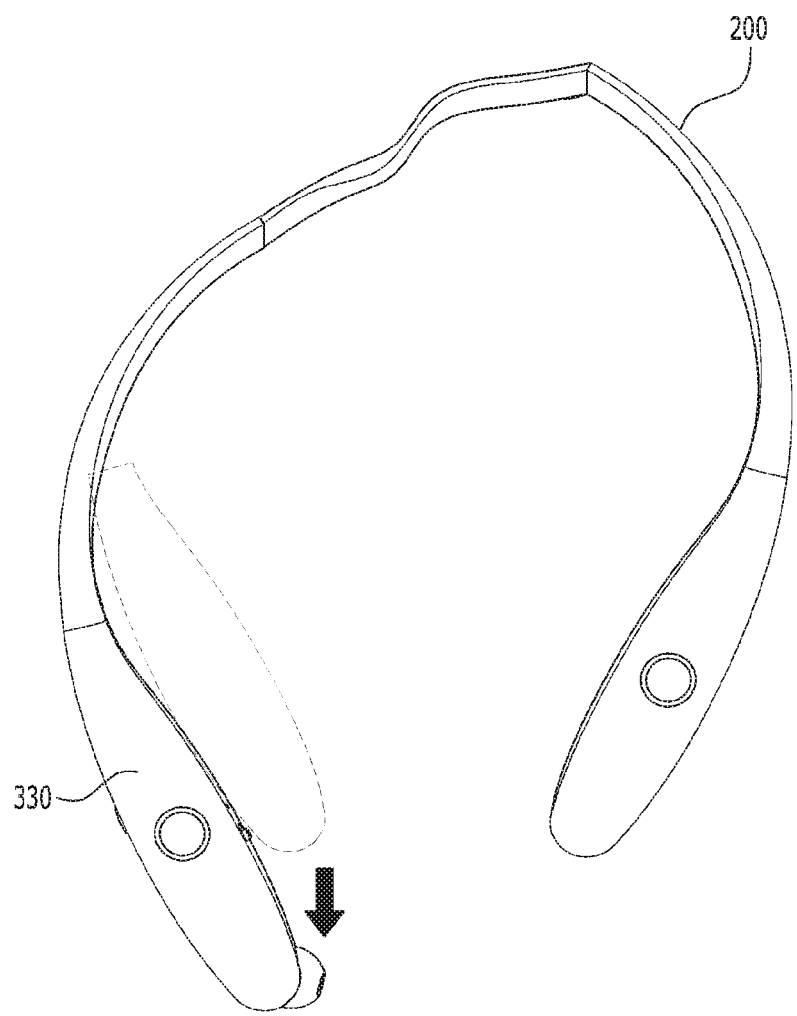
Figure 7E:
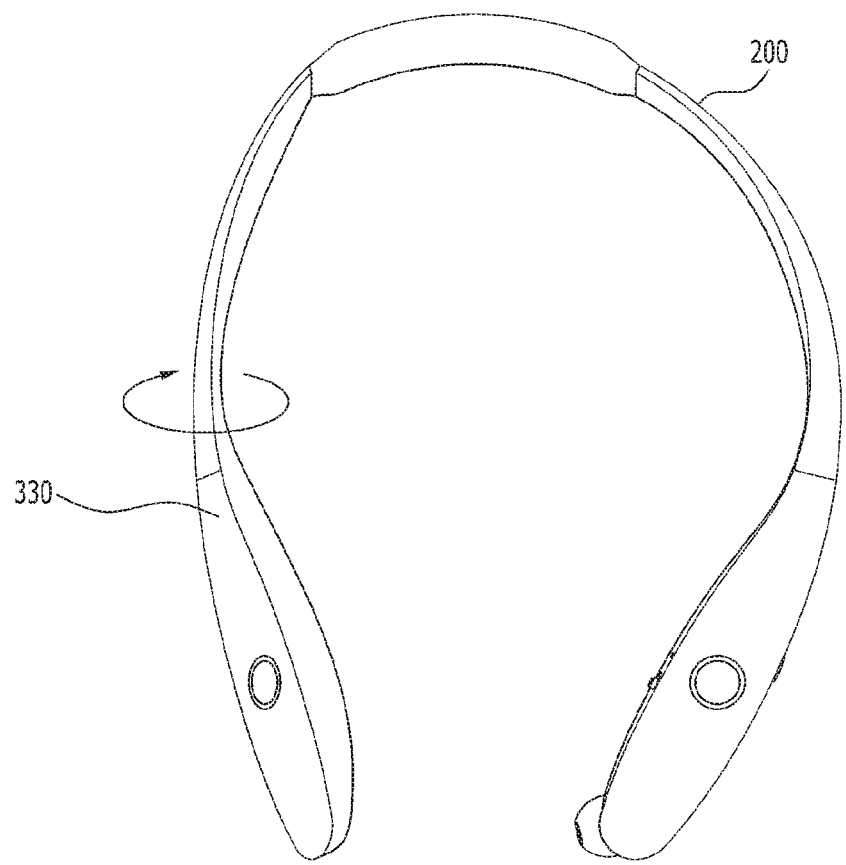

Based on the sensors, the controller 280 may receive inputs of various gestures. FIGS. 7a to 7j are views illustrating input examples of various gestures. The controller 280 may receive inputs of a gesture moving the main body 330 toward any one direction and a gesture twisting the main body 330 by using the gyro sensor and the acceleration sensor included in the fixed frame 320. As shown in FIG. 7a, the controller 280 may receive an input of a gesture outwardly pulling any one or both of the left and right main bodies 330. As shown in FIG. 7b, the controller 280 may receive an input of a gesture inwardly pulling any one or both of the left and right main bodies 330. Moreover, as shown in FIG. 7c, the controller 280 may receive an input of a gesture upwardly lifting any one or both of the left and right main bodies 330. As shown in FIG. 7d, the controller 280 may receive an input of a gesture downwardly descending any one or both of the left and right main bodies 330. Additionally, as shown in FIG. 7e, the controller 280 may receive an input of a gesture twisting any one or both of the left and right main bodies 330 clockwise or counterclockwise.

Figure 7F:
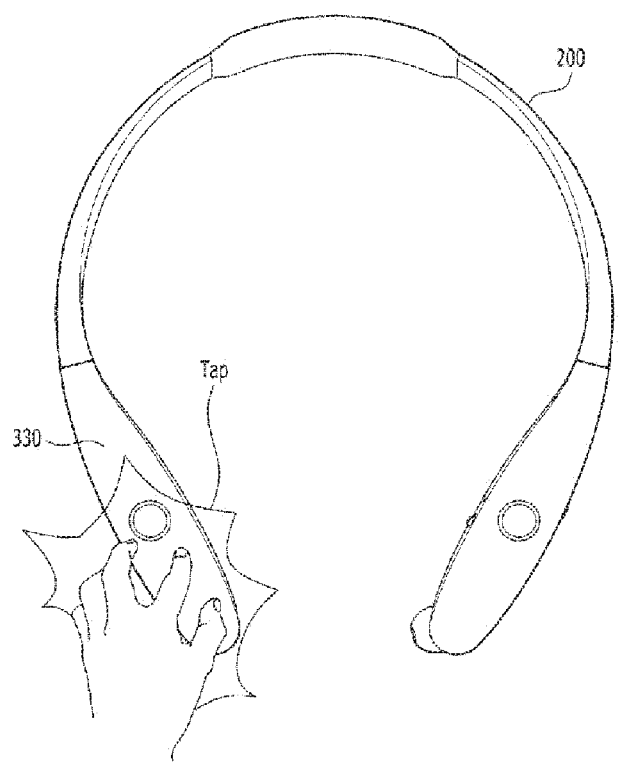

The controller 280 may receive an input of a gesture beating the main bodies 330, as shown in FIG. 7f, by using the gyro sensor and the acceleration sensor included in the fixed frame 320.

Figure 7G:
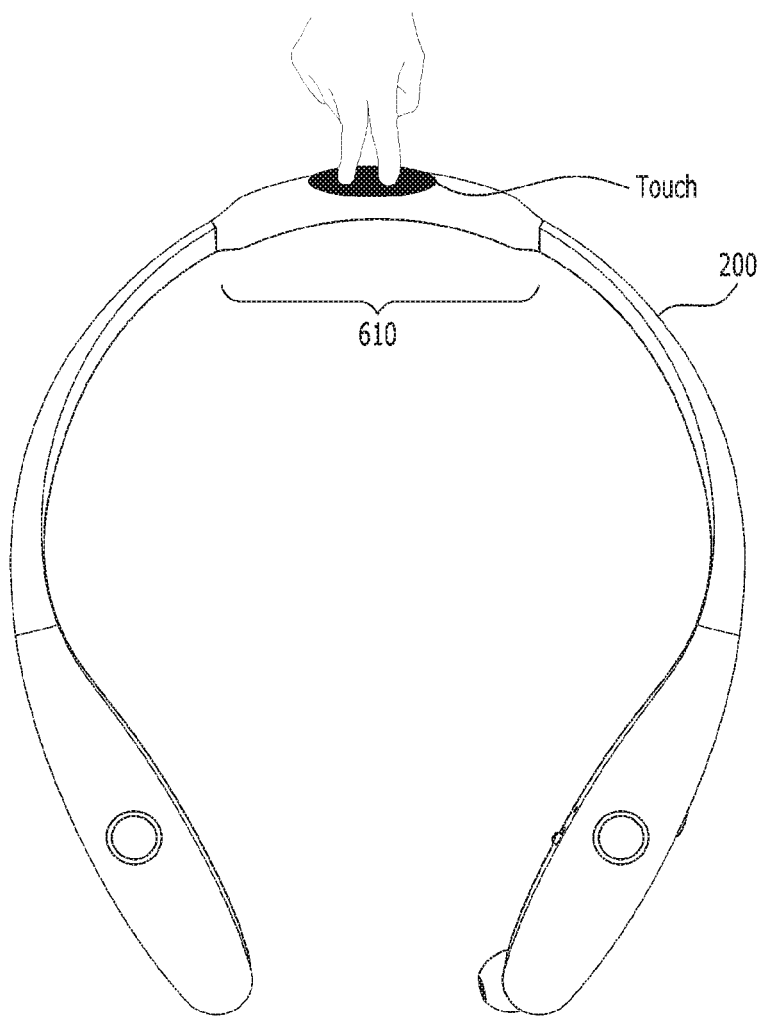

The controller 280 may receive an input of a gesture applying a pressure to the flexible portion 710, an input of a gesture touching the flexible portion 710, or an input of a gesture allowing a pointer to approach the flexible portion 610, as shown in FIG. 7g, by using the pressure sensor, the touch sensor and the proximity sensor which are installed in flexible portion 710.

Figure 7H:
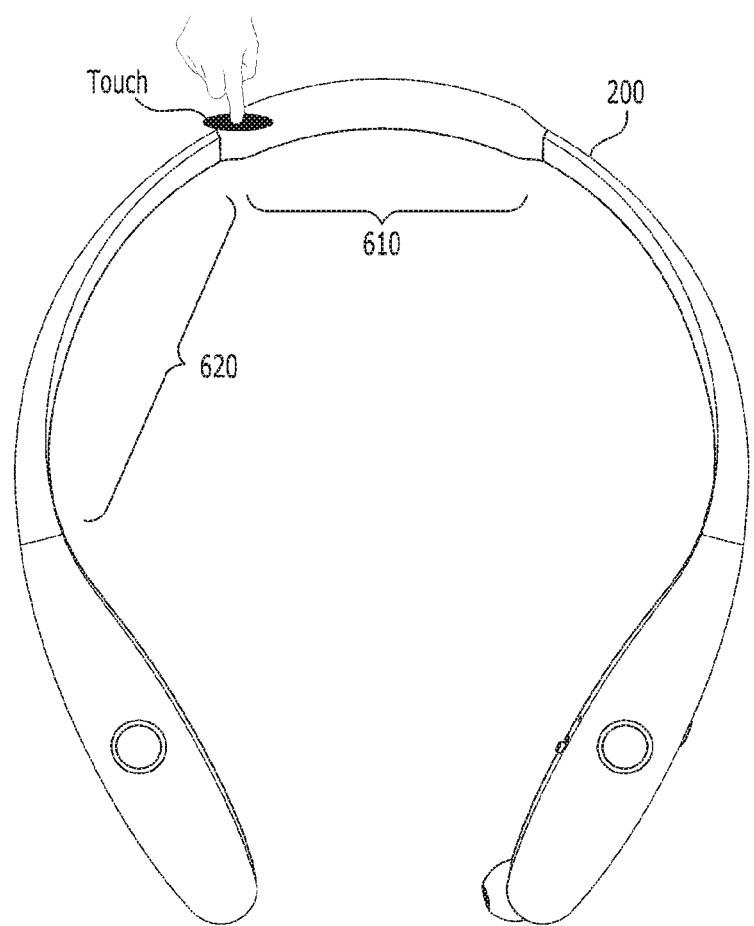

The controller 280 may receive an input of a gesture touching a boundary between the flexible portion 710 and a fixed portion 720 or an input of a gesture allowing a pointer to approach the boundary between the flexible portion 710 and the fixed portion 720, as shown in FIG. 7h, by using the touch sensor and the proximity sensor which are installed between flexible portion 710 and the fixed portion 720.

Figure 7I:
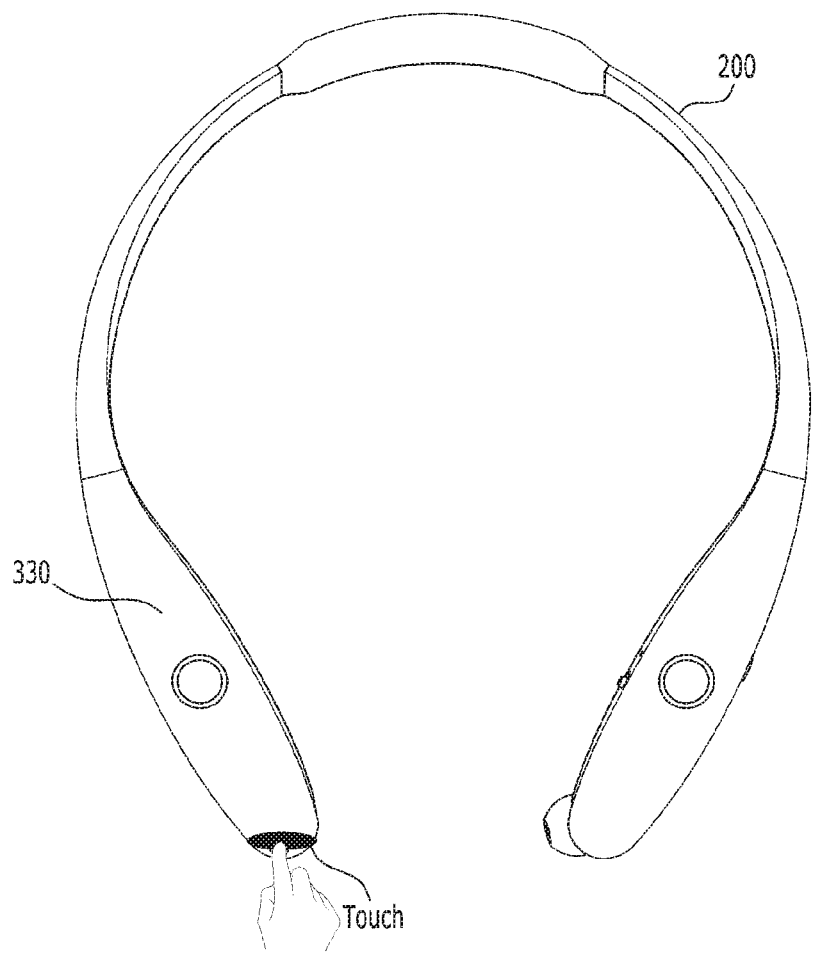

The controller 280 may receive an input of a gesture touching the end of the main body 330 or an input of a gesture allowing a pointer to approach the end of the main body 330, as shown in FIG. 7i, by using the touch sensor and the proximity sensor which are installed at the end of the main body 330.

Figure 7J:
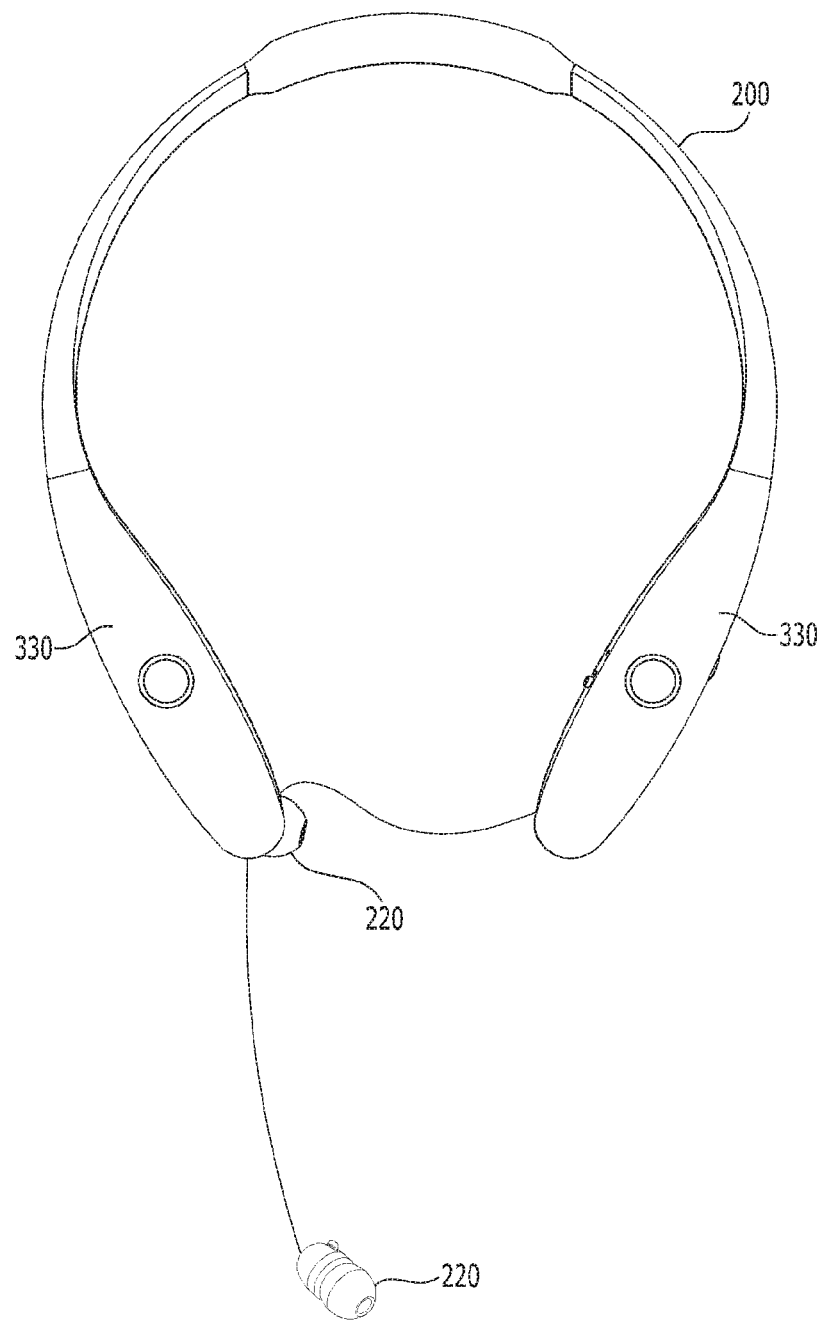

The controller 280 may receive an input of a gesture allowing the earphone 220 to approach the receiving groove 336, as shown in FIG. 7j, by using the magnet sensor installed near the receiving groove 336. In this case, the gesture allowing the earphone 220 to approach the receiving groove 336 may be a gesture allowing any one of the earphone 220 to approach the receiving groove 336 formed at the main body of an opposite side of the earphone as shown in FIG. 7j, or may be a gesture allowing any one of the earphone 220 to approach the receiving groove 336 formed at the main body of the same side of the earphone 220 although not shown.

Although not shown, a sensor such as proximity sensor may be included in the earphone 220. The controller 280 may receive an input of a gesture extracting the earphone 220 from ears of a user and an input of a gesture putting the earphone 220 in ears of a user through the proximity sensor of the earphone 220.

The controller 280 may identify whether a gesture pulling the cable of the earphone 220 has been input through rotation of the cable winder 410.

As described above, the controller 280 may receive various gesture inputs by using a sensing signal of the sensing unit 250. Also, the controller 280 may receive a gesture input of repeating the gestures shown in FIGS. 7a to 7j for a predetermined number of times or more, or may receive a combined gesture input of two or more gestures shown in FIGS. 7a to 7j.

The wireless receiver 200 may include a sensor for sensing whether a user wears the wireless receiver 200 and for sensing whether a user may feel vibration well. For example, the wireless receiver 200 may include at least one of a temperature sensor, an SAR sensor, and an optical sensor, and may sense whether a user wears the wireless receiver 200 and sense whether a user may feel vibration well, by using at least one of the listed sensors.

For example, based on whether a body temperature is sensed through the temperature sensor, the wireless receiver 200 may determine whether the user wears the wireless receiver 200. However, if the wireless receiver 200 is located outside an outerwear of a room temperature is similar to a body temperature, an error may occur in a determination method based on the temperature sensor.

Therefore, the wireless receiver 200 according to the present invention may determine whether the user wears the wireless receiver 200, by using the SAR (Synthetic Aperture Radar) sensor. The SAR sensor is modified from a capacitive sensor, and may be used to measure a distance with a dielectric based on sensitivity with the dielectric. If the dielectric like a skin of a human body is in contact with the SAR sensor, a high sensitivity value may be measured. Unlike this, if the skin of the human body is covered by clothes, a sensitivity value sensed by the SAR sensor may be relatively small. Also, if the skin of the user is far away from the SAR sensor, the sensitivity value sensed by the SAR sensor may be very small. In this way, the SAR sensor may determine whether the user wears the wireless receiver 200 and is in contact with the skin of the user, determine whether the user wears the wireless receiver 200 but the skin is covered by clothes, or determine whether the user does not wear the wireless receiver 200, in accordance with high and low values of the sensitivity values of the SAR sensor.

For example, FIG. 8 is a view illustrating an example of determining whether a user wears the wireless receiver 200, by using an SAR sensor. As shown in FIG. 8, the wireless receiver 200 may be provided with an SAR sensor. In (a) of FIG. 8, a node of the SAR sensor is provided at both sides of the wireless receiver 200. However, it is not to be understood that the node of the SAR sensor should be provided at both sides of the wireless receiver 200 as shown in FIG. 8.

The controller 280 may determine that the user wears the wireless receiver, based on a recognition sensitivity level at each node of the SAR sensor.

For example, as shown in (b) of FIG. 8, if recognition sensitivity of the first and second nodes of the SAR sensor is a 'very strong' level (that is, if a distance with a dielectric is very short), the controller 280 may determine that the user wears the wireless receiver 200 and the wireless receiver 200 is in contact with the skin of the user.

If recognition sensitivity at the first and second nodes of the SAR sensor is a 'strong' level (that is, if a distance with a dielectric is short), the controller 280 may determine that the user wears the wireless receiver 200 and wears a thin cloth.

If recognition sensitivity at the first and second nodes of the SAR sensor is a 'weak' level (that is, if a distance with a dielectric is long), the controller 280 may determine that the user wears the wireless receiver 200 and wears a thick cloth.

If recognition sensitivity at the first and second nodes of the SAR sensor is a 'very weak' level (that is, if a distance with a dielectric is very long), the controller 280 may determine that the user does not wear the wireless receiver 200.

The controller 280 may determine whether the wireless receiver 200 is inclined toward at any one side, based on the recognition sensitivity level at the second node of the SAR sensor.

For example, as shown in (c) of FIG. 8, if the recognition sensitivity at the first node of the SAR sensor is higher than that at the second node, the controller 280 may determine that the wireless receiver 200 is inclined to a left side.

By contrast, if the recognition sensitivity at the second node of the SAR sensor is higher than that at the first node, the controller 280 may determine that the wireless receiver 200 is inclined to a right side.

The wireless receiver 200 may determine whether the user wears the wireless receiver, through the optical sensor. The optical sensor may determine a distance between objects and attributes of the objects by receiving light reflected after emitting the light (for example, infrared rays). For example, since the amount of light reflected in accordance with a color of an object may be varied, the controller 280 may determine whether the wireless receiver 200 is in contact with the skin of the user in accordance with the amount of light reflected in a light receiving unit. That is, the controller 280 may determine whether the wireless receiver 200 is located near the user (that is, whether the user wears the wireless receiver 200), through the optical sensor, and may determine whether the wireless receiver 200 is in contact with the skin of the user or is worn on a cloth of the user, in accordance with a color of light which is reflected.

Based on the aforementioned description, the mobile terminal 100 and the wireless receiver 200 according to the present invention will be described in detail. For easiness of identification, a prefix 'first' is added to the element of the mobile terminal 100, and a prefix 'second' is added to the element of the wireless receiver 200.

Figure 9:
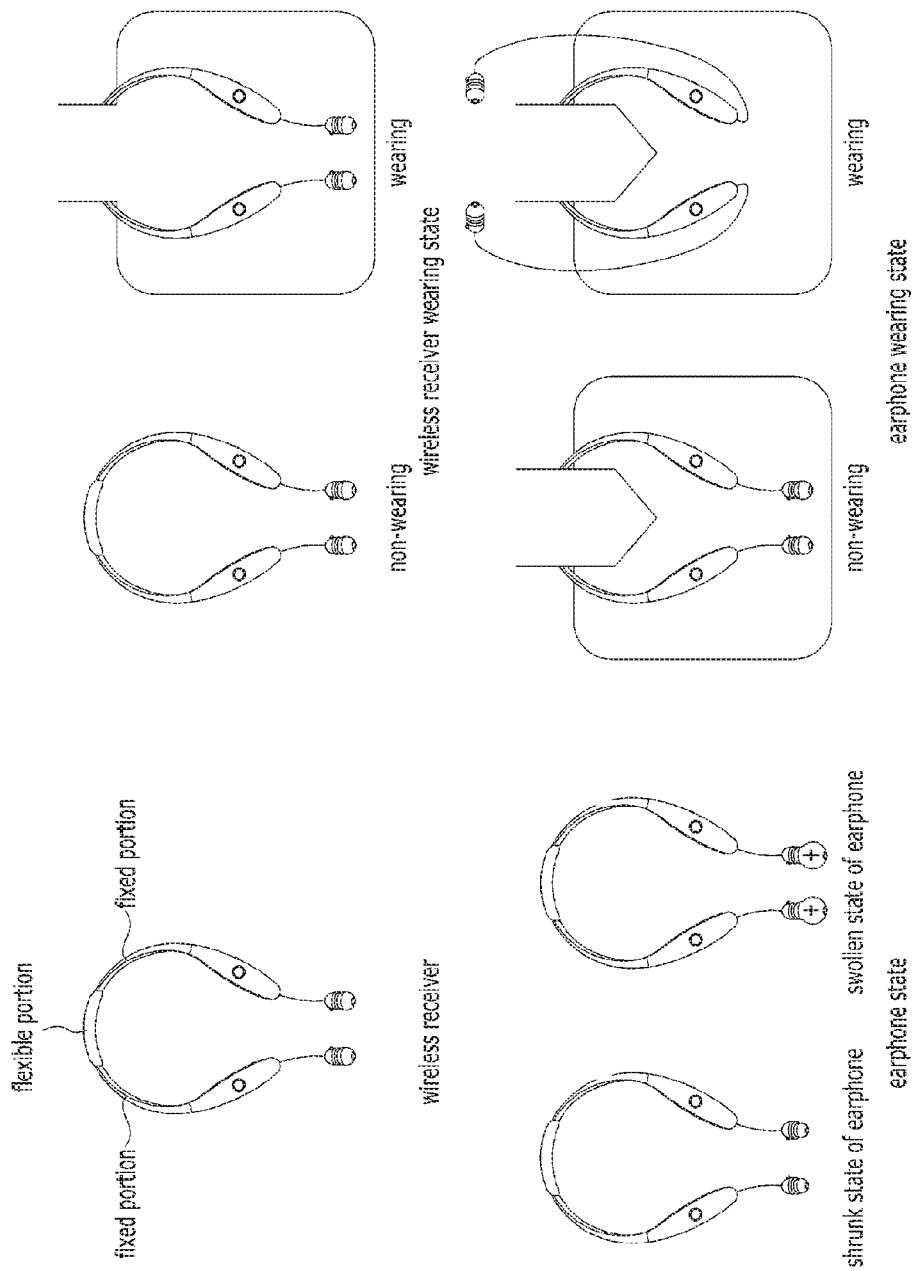
FIG. 9 is a view illustrating an example of a wireless receiver which is simply schematized.

Prior to description of the mobile terminal 100 and the wireless receiver 200 according to the present invention, the wireless receiver 200 is briefly schematized as shown in FIG. 9.

Figure 10:
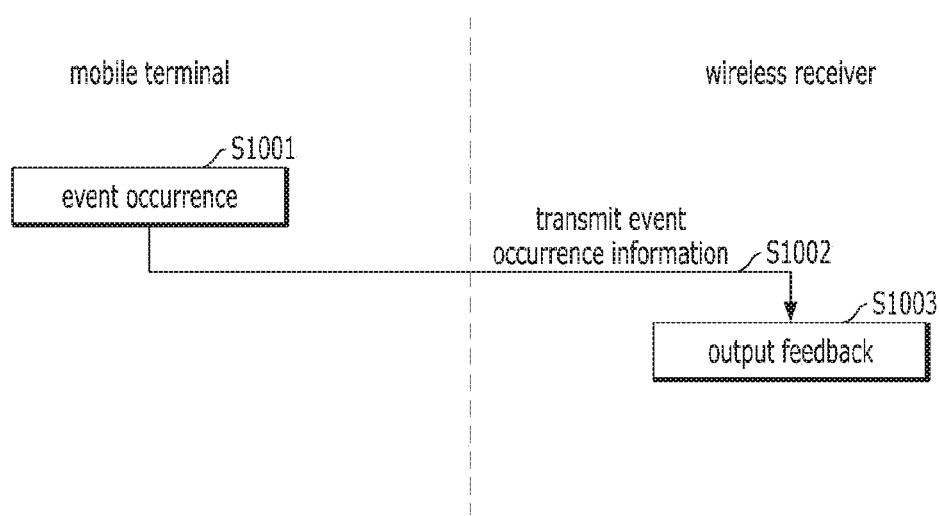
FIG. 10 is a flow chart illustrating an operation of a mobile terminal and a wireless receiver according to one embodiment of the present invention.

FIG. 10 is a flow chart illustrating an operation of a mobile terminal and a wireless receiver according to one embodiment of the present invention.

Referring to FIG. 10, first of all, if an event occurs in the mobile terminal 100 (S1001), the first controller 180 may transmit event occurrence information indicating that the event has occurred, to the wireless receiver 200 (S1002). In this case, the event may include a case where the mobile terminal 100 receives an incoming call, a case where a message is received (in this case, the message may include various types of data, which may be received by the mobile terminal 100 from an external terminal (or server), such as a text message, an email, a push message), a case where wireless communication configuration between the mobile terminal 100 and the wireless receiver 200 is completed (for example, a case where Bluetooth pairing between the mobile terminal 100 and the wireless receiver 200 is successfully completed), and a case where the mobile terminal 100 should output an alarm (for example, a current time becomes an alarm time which is previously registered).

If the event occurrence information is received, the second controller 280 may output a feedback for indicating that the event has occurred in the mobile terminal 100 (S1003). In this case, the feedback may be at least one type of vibration and sound. At this time, the second controller 200 may control feedback output intensity by considering a wearing state of the user who wears the wireless receiver 20. This detailed description will be described with reference to FIGS. 11 and 12.

Figure 11A:
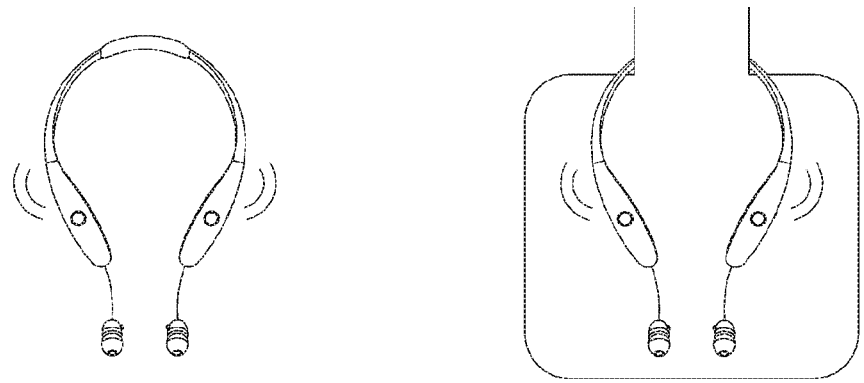

FIGS. 11*a* and 11*b* are views illustrating an example that vibration output intensity is controlled.

The second controller 280 may control vibration output intensity depending on whether the user wears the wireless receiver 200. In more detail, as shown in (a) of FIG. 11*a*, if it is determined that the user does not wear the wireless receiver 200, the second controller 280 may output vibration at high level. This is to notify the user that the wireless receiver 200 is vibrated, through a sound generated by vibration or a touch of another object which is vibrated due to vibration of the wireless receiver 200, by intensifying intensity of vibration output.

Unlike the above description, as shown in (b) of FIG. 11*a*, if it is determined that the user wears the wireless receiver 200, the second controller 280 may output vibration at relatively low level.

At this time, the controller may control a vibration output level more precisely by identifying a case where the wireless receiver 200 is in contact with the skin of the user from a case where the wireless receiver 200 is in contact with an outerwear.

For example, as shown in (a) of FIG. 11*b*, if the user wears a thick outerwear and the wireless receiver 200 is laid on the thick outerwear, the second controller 280 may output vibration at a first level. As shown in (b) of FIG. 11*b*, if the user wears a relatively thin outerwear and the wireless receiver 200 is laid on the thin outerwear, the second controller 280 may output vibration at a second level lower than the first level.

On the other hand, if the wireless receiver 200 is laid on the skin of the user, the second controller 280 may output vibration at a third level lower than the second level as shown in (c) of FIG. 11*b*.

In a state that the user does not wear the wireless receiver 200 and thus vibration is output at high level, if the user wears the wireless receiver 200, the second controller 280 may downgrade the output level of the vibration.

FIG. 12 is a view illustrating an example that a volume is controlled.

If an event occurs in the mobile terminal 100, the wireless receiver 200 may output audio data for indicating that the event has occurred in the mobile terminal 100. At this time, the audio data may be received from the mobile terminal 100 or may previously be stored in the wireless receiver 200.

In outputting the audio data, the second controller 280 may control a volume depending on whether the user wears the wireless receiver 200. In more detail, as shown in (a) of FIG. 12, if it is determined that the user does not wear the wireless receiver 200, the second controller 280 may output audio data by setting the volume at high level. This is to notify the user that audio data are output through the wireless receiver 200 as the audio data output through the wireless receiver 200 leak out through the earphone 220 by turning up the volume.

On the other hand, if it is determined that the user wears the wireless receiver 200, the second controller 280 may output audio data by setting the volume at relatively low level. At this time, the second controller 280 may control the volume more precisely based on whether the user wears the earphone 220.

For example, as shown in (b) of FIG. 12, if the user does not wear the earphone 220, the second controller 280 may set the volume at a first level. By contrast, as shown in (c) of FIG. 12, if the user wears the earphone 220, the second controller 280 may set a second level lower than the first level.

In a state that the user does not wear the wireless receiver 200, if the user wears the wireless receiver 200 later and wears the earphone 220, the controller may gradually downgrade the volume level in accordance with the status. At this time, the second controller 280 may automatically determine the volume when the user wears the earphone 220 by considering periphery noise. That is, if periphery noise is strong, the second controller 280 may set the volume when the user wears the earphone 220, at a relatively high level, and if periphery noise is weak, the second controller 280 may set the volume when the user wears the earphone 220, at a relatively low level.

The wireless receiver 200 according to the present invention may output any one of vibration and sound, or may output vibration and sound at the same time.

For another example, the second controller 280 may basically output vibration, and may determine whether to additionally output sound depending on whether the user wears the earphone 220.

Figure 13:
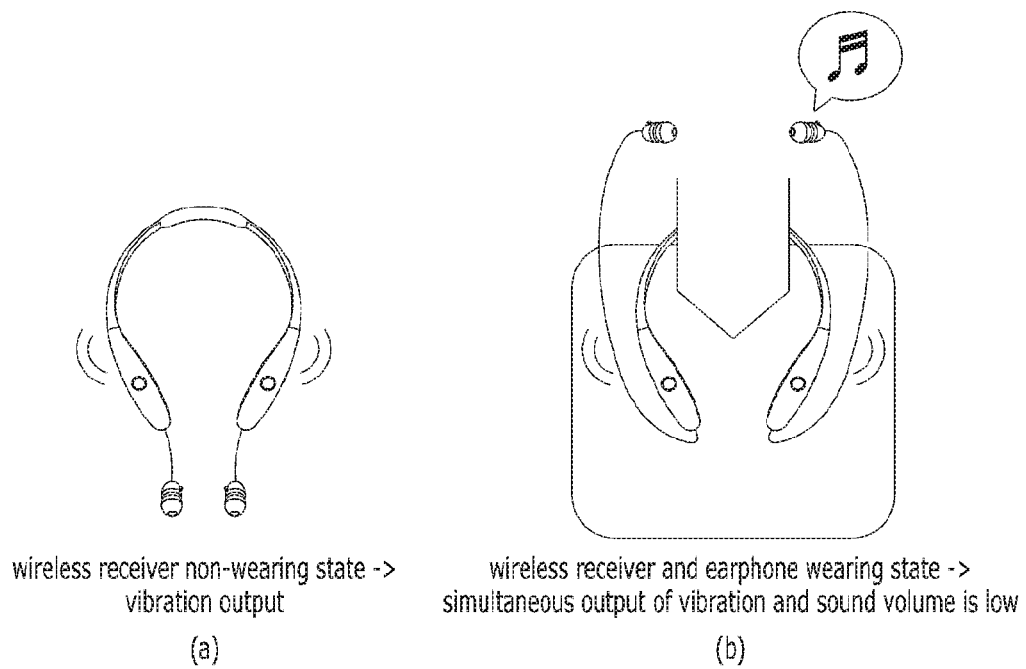
FIG. 13 is a view illustrating an example that a feedback output type is varied depending on whether a user wears an earphone.

For example, FIG. 13 is a view illustrating an example that a feedback output type is varied depending on whether a user wears an earphone 220. If the user wears the wireless receiver 200 but does not wear the earphone 220, the controller may output vibration to correspond to the event occurrence of the mobile terminal 100 as shown in (a) of FIG. 13. On the other hand, if the user wears the wireless receiver 200 and also wears the earphone 220, the controller may output vibration at the same time to correspond to the event occurrence of the mobile terminal 100 as shown in (b) of FIG. 13.

Next, a case where the wireless receiver 200 receives audio data from the mobile terminal 100 and outputs the received audio data will be described in detail.

If a wireless communication channel is configured between the mobile terminal 100 and the wireless receiver 200, the wireless receiver 200 may receive audio data from the mobile terminal 100 and output the received audio data through the earphone 220. For example, if play of a multimedia file (for example, music file or moving picture file) is requested through the mobile terminal 100, the first controller 180 may transmit audio data of the multimedia file to the wireless receiver 200 and output the audio data through the wireless receiver 200.

At this time, the second controller 280 may control the volume depending on whether the user wears the wireless receiver 200, as described above with reference to FIG. 12. In more detail, if it is determined that the user does not wear the wireless receiver 200, the second controller 280 may output the audio data by setting the volume at a high level, and if it is determined that the user wears the wireless receiver 200, the second controller 280 may output the audio data by setting the volume at a relatively low level. At this time, the second controller 280 may control the volume more precisely based on whether the user wears the earphone 220.

For another example, the first controller 180 may wait for play of the multimedia file until the user wears the earphone 220 and then may start play of the multimedia file when the user wears the earphone 220. This detailed description will be understood with reference to FIG. 14.

Figure 14:
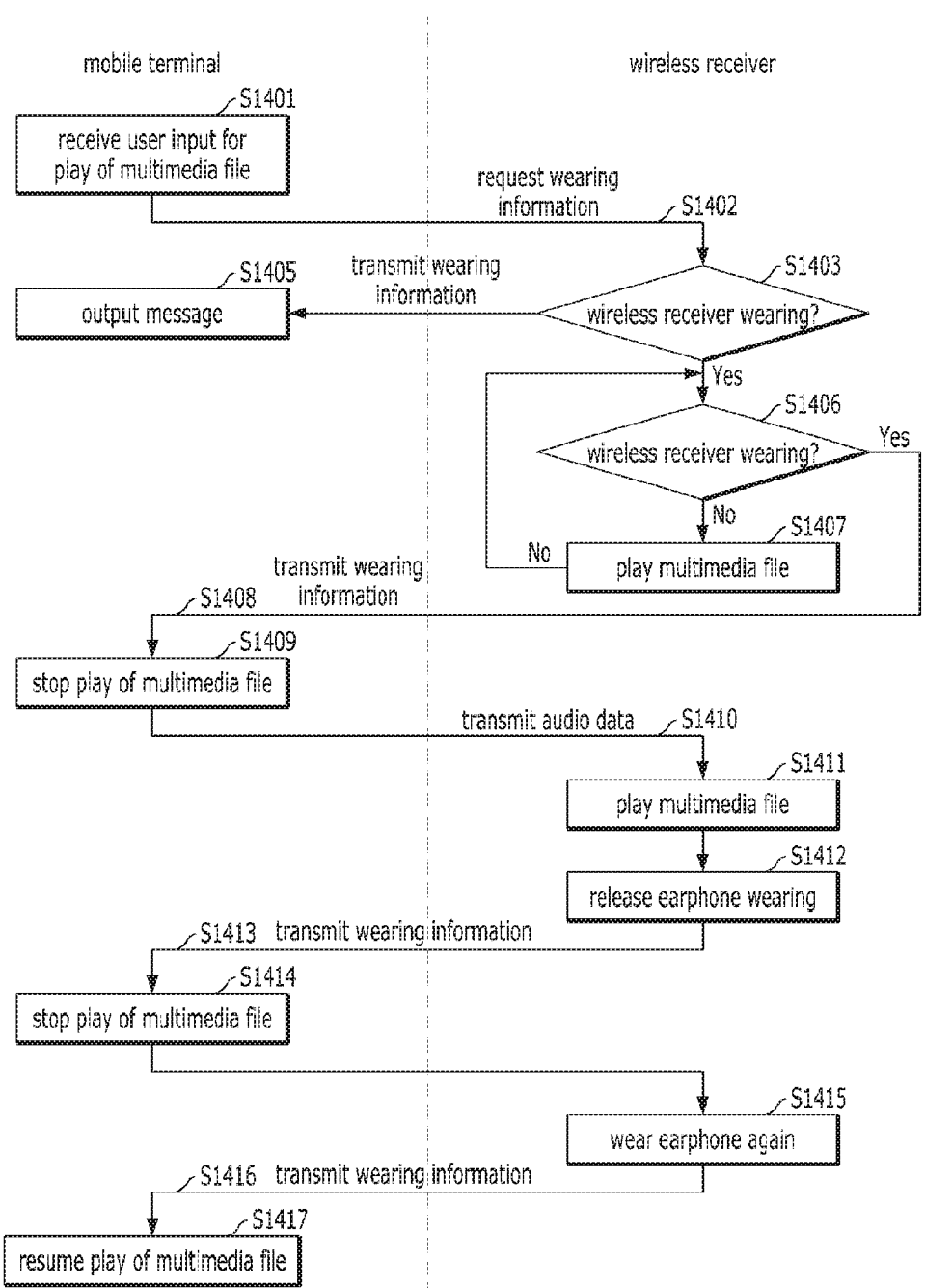
FIG. 14 is a flow chart illustrating an operation of a mobile terminal according to one embodiment of the present invention.

FIG. 14 is a flow chart illustrating an operation of a mobile terminal 100 according to one embodiment of the present invention. If a user input for playing the multimedia file is received (S1401), the first controller 180 may inquire the wireless receiver 200 of a wearing state of the wireless receiver 200 (S1402).

If it is determined that the user does not wear the wireless receiver 200 (S1403), the second control 280 may transmit wearing information, which indicates that the user does not wear the wireless receiver 200, to the mobile terminal 100 (S1404). If the wearing information which indicates that the user does not wear the wireless receiver 200 is received, the first controller 180 may output a message, which recommends the user to wear the wireless receiver 200, through the first display unit 161 (S1405).

Figure 15:
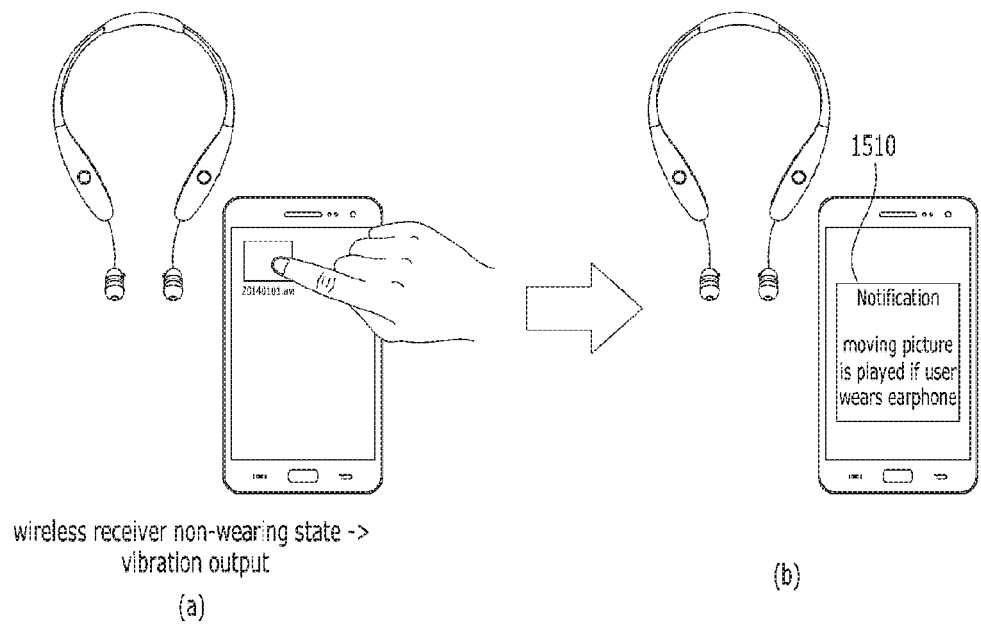
FIG. 15 is a view illustrating an example that a message recommending wearing of a wireless receiver is output to a mobile terminal.

FIG. 15 is a view illustrating an example that a message recommending wearing of a wireless receiver 200 is output to a mobile terminal 100. As shown in (a) of FIG. 15, if a user input for requesting play of the multimedia file is input to the mobile terminal 100 but the user does not wear the wireless receiver 200, the first controller 180 may output a message, which recommends the user to wear the wireless receiver 200, through the first display unit 161 as shown in (b) of FIG. 15.

The first controller 180 may display a message for a predetermined time, or may display the message until wearing information, which indicates that the user wears the wireless receiver 200 or the earphone 220, is received.

If it is determined that the user wears the wireless receiver 200 but does not wear the earphone 220 (S1406), the second controller 280 may output vibration to indicate that the multimedia file is being played through the mobile terminal 100 (S1407).

If it is determined that the user wears the earphone 220 (S1406), the second controller 280 may transmit wearing information, which indicates that the user has worn the earphone 220, to the mobile terminal 100 (S1408). If the wearing information indicating that the user wears the earphone 220 is received, the first controller 180 may play the multimedia file (1409) and transmit audio data of the multimedia file to the wireless receiver 200 (S1410). If the audio data are received, the second controller 280 may output the received audio data through the earphone 220 (S1411). At this time, the second controller 280 may automatically control the volume by considering periphery noise.

If the user takes off the earphone 220 while the multimedia file is being played (S1412), the second controller 280 may transmit wearing information indicating that the user has took off the earphone 220, to the mobile terminal 100 (S1413). If the wearing information indicating that the user has took off the earphone 220 is received, the first controller 180 may temporarily stop play of the multimedia file (S1414). Afterwards, if the user wears the earphone 220 again (S1415), the second controller 280 may transmit wearing information, which indicates that the user has worn the earphone 220 again, to the mobile terminal 100 (S1416). If the wearing information, which indicates that the user has worn the earphone 220 again, is received, the first controller 180 may resume play of the multimedia file (S1417).

Figure 16:
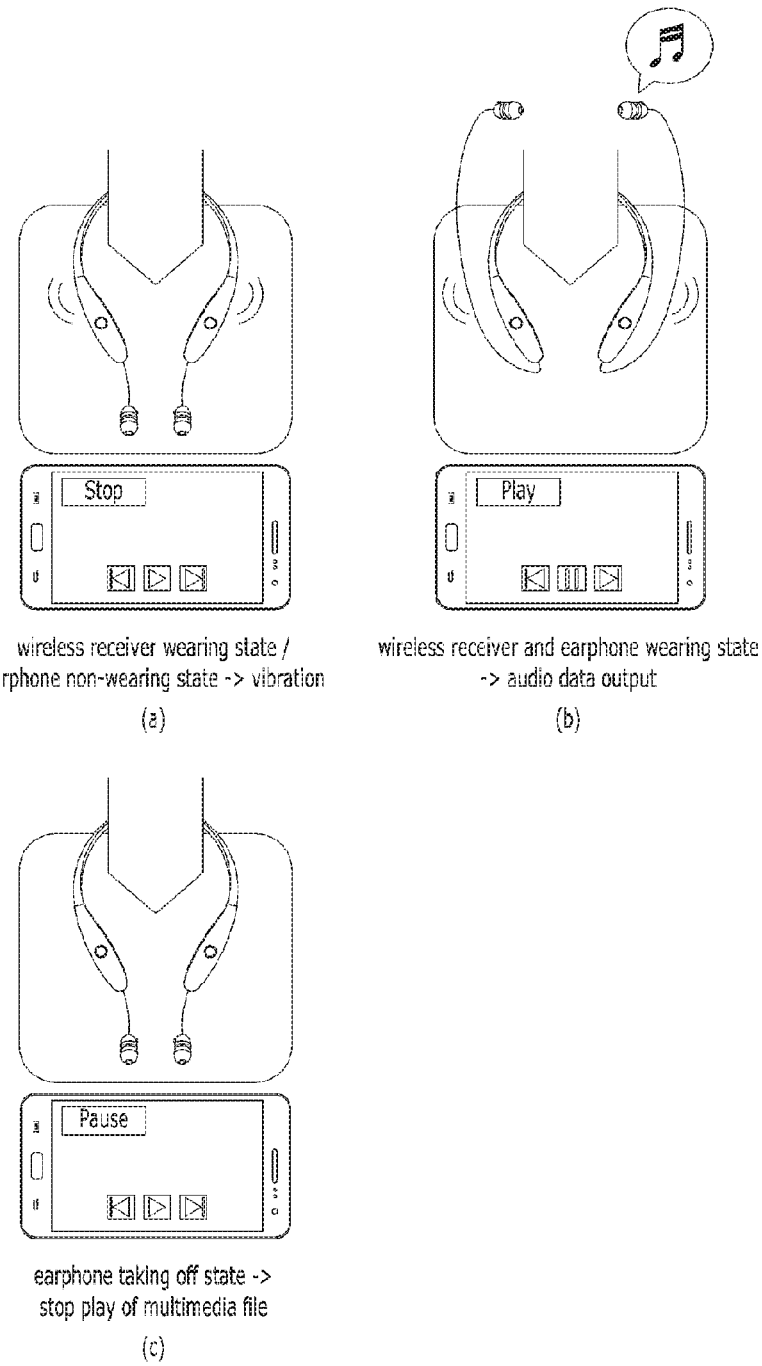
FIG. 16 is a view illustrating an operation of a wireless receiver according to a wearing state of the wireless receiver.

FIG. 16 is a view illustrating an operation of a wireless receiver 200 according to a wearing state of the wireless receiver 200.

As shown in (a) of FIG. 16, if the user wears the wireless receiver 200 but does not wear the earphone 220, the second controller 280 may indicate that play of the multimedia file is being prepared, by outputting vibration.

Afterwards, as shown in (b) of FIG. 16, if the user wears the earphone 220, the mobile terminal 100 may start play of the multimedia file, and the wireless receiver 200 may output the audio data received from the mobile terminal 100.

Then, as shown in (c) of FIG. 16, if the user takes off the earphone 220 while the multimedia file is being played, play of the multimedia file in the mobile terminal 100 may temporarily be stopped. In a state that play of the multimedia file is temporarily stopped, if the user wears the earphone 220 again, play of the multimedia file may be resumed.

If the user moves violently (for example, if the user runs), the wireless receiver 200 worn on the neck of the user may seriously be shook or the earphone 220 put on the ears of the user may be took off. Therefore, the wireless receiver 200 according to the present invention may tighten the neck of the user to avoid shaking in an environment that the user moves violently, or may swell the earphone 220 to prevent the earphone 220 from being taken off. This detailed description will be understood with reference to FIG. 17.

FIG. 17 is a view illustrating an operation of a wireless receiver 200 when a user moves violently.

The second controller 280 may determine whether the user moves violently, based on the sensing signal of the sensing unit 250. In more detail, if it is sensed that the wireless receiver 200 moves at a predetermined speed or more or shakes in all directions, the second controller 280 may determine that the user moves violently.

If the user moves violently, the second controller 280 may control the wireless receiver 200 to tighten the neck of the user by making a distance between the fixed portions short as shown in (a) of FIG. 17. As the wireless receiver 200 tightens the neck of the user, shaking of the wireless receiver 200 may be alleviated.

Additionally, if the user wears the earphone 220, the second controller 280 may control the earphone 220 to allow the earphone 220 to be swollen as shown in (b) of FIG. 17. As the earphone 220 is swollen, the earphone 220 may be prevented from being taken off from the ears.

The mobile terminal 100 according to the present invention may control the wireless receiver 200 to tighten the neck of the user when the wireless receiver is inclined to one side as the user moves violently. Also, if the location of the wireless receiver 200 is continuously twisted even though the wireless receiver 200 tightens the neck of the user, the second controller 280 may output a feedback indicating that the wearing state of the wireless receiver has been twisted. This detailed description will be understood with reference to FIG. 18.

FIG. 18 is a view illustrating an example that a wireless receiver 200 tightens a neck of a user.

In a state that the wireless receiver 200 is worn on the neck of the user in accordance with left and right balance as shown in (a) of FIG. 18, the wireless receiver 200 may be inclined to any one side on the neck of the user as shown in (b) of FIG. 18 due to violent movement of the user.

If it is determined that the wireless receiver 200 is inclined to any one side, the second controller 280 may control the wireless receiver 200 to tighten the neck of the user by making a distance between the fixed portions short as shown in (c) of FIG. 18. As the wireless receiver 200 tightens the neck of the user, shaking of the wireless receiver 200 may be alleviated.

Also, if the location of the wireless receiver 200 is continuously inclined to any one side even though the wireless receiver 200 tightens the neck of the user, the second controller 280 may output vibration through the wireless receiver 200 as shown in (d) of FIG. 18.

In the examples shown in FIGS. 17 and 18, if the user moves violently, the wireless receiver 200 tightens the neck of the user or the earphone 220 is swollen. Unlike the shown examples, the second controller 280 may control the wireless receiver 200 to tighten the neck of the user in response to the user input or swell the earphone 220.

If the wireless receiver 200 tightens the neck of the user, the airway of the user may be pressurized, whereby the user may feel stuffiness. Also, if the earphone 220 is too swollen, the user may feel pain from the ears. To avoid this, the second controller 280 may control a neck tightening level of the wireless receiver 200 in response to the user input, or may control a swelling level of the earphone 220. This detailed description will be understood with reference to FIG. 19.

Figure 19:
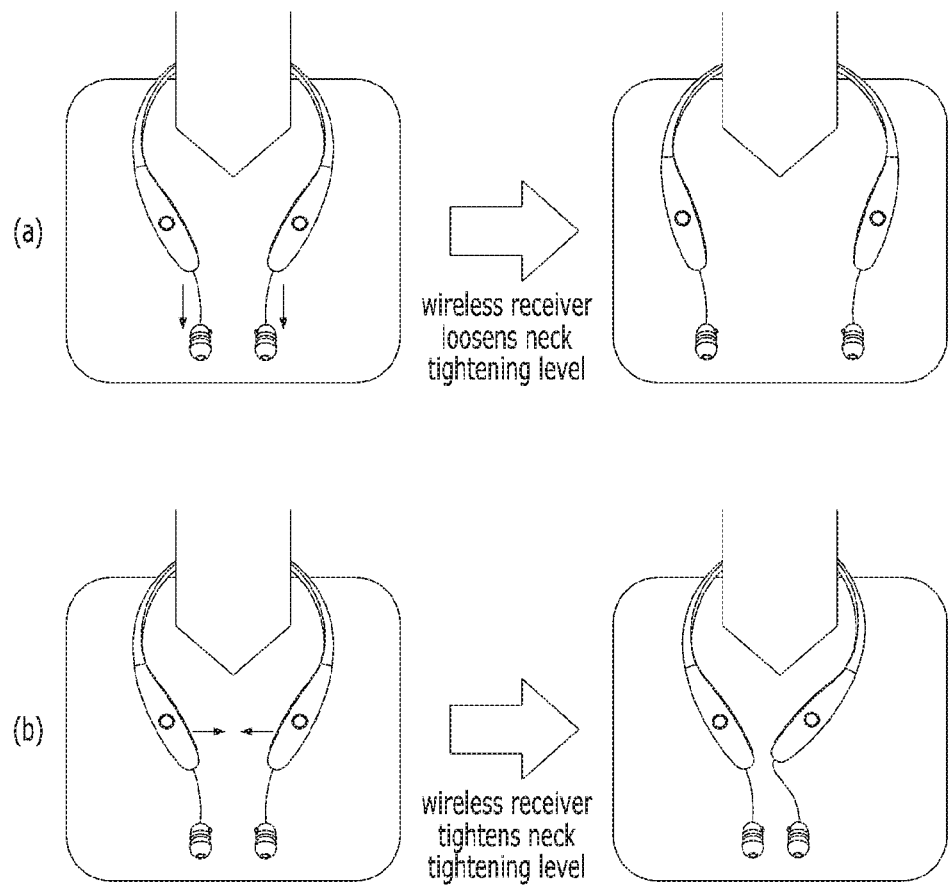
FIG. 19 is a view illustrating an example that a neck tightening level of a wireless receiver is controlled.

FIG. 19 is a view illustrating an example that a neck tightening level of a wireless receiver 200 is controlled.

As shown in (a) of FIG. 19, a gesture input for pulling the cable of the earphone 220 is received in a state that the wireless receiver 200 tightens the neck of the user, the second controller 280 may loosen the neck tightening level of the wireless receiver 200 by making the distance between the fixed portions long.

On the other hand, as shown in (b) of FIG. 19, if a user input for inwardly pulling the main body is received, the second controller 280 may tighten the neck tightening level of the wireless receiver 200 by making the distance between the fixed portions short.

In FIG. 19, the user input for controlling the neck tightening level of the wireless receiver 200 is illustrated as an example of a gesture for pulling the cable of the earphone 220 or inwardly pulling the main body. However, this is only exemplary for convenience of description, and the user input for controlling the neck tightening level of the wireless receiver 200 is not limited to the example shown in FIG. 19. The various gesture input examples described with reference to FIGS. 7a to 7j may be applied to the user input for controlling the neck tightening level of the wireless receiver 200.

Although not shown, the second controller 280 may control a swelling level of the earphone 220 based on the user input.

If the earphone 220 is swollen, an area of ears covered by the earphone 220 becomes widen, whereby external sound is not likely to enter the ears. Therefore, the user may not normally listen to sound which is externally generated. This may cause a problem that the user cannot listen to a warning sound (for example, klaxon of car) indicating that the user is in a danger state. To solve this problem, the wireless receiver 200 according to the present invention may control the earphone 220 to be automatically shrunk if external noise occurs continuously. This detailed description will be understood with reference to FIG. 20.

Figure 20:
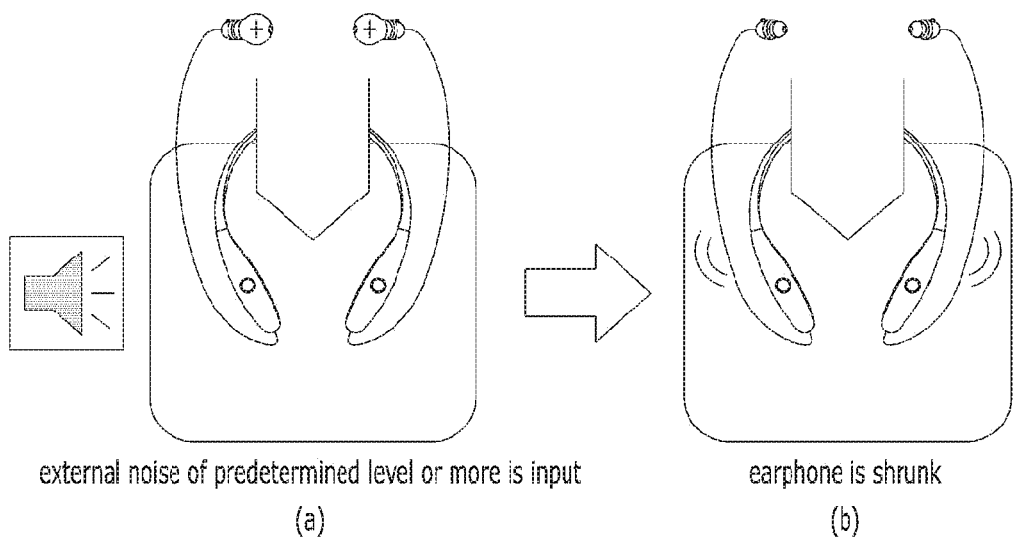
FIG. 20 is a view illustrating an example that an earphone is shrunk automatically.

FIG. 20 is a view illustrating an example that an earphone 220 is shrunk automatically.

In a state that the earphone 220 is swollen, if noise of a predetermined level or more occurs continuously for a predetermined time or more, the second controller 280 may control the earphone 220 to be shrunk as shown in the examples shown in (a) and (b) of FIG. 20. As the earphone 220 is shrunk, the user may listen to sound which is externally generated.

The earphone 220 is shrunk and at the same time the second controller 280 may automatically downgrade the volume of the earphone 220.

If music is output through the wireless receiver 200, the mobile terminal 100 may automatically determine a genre of music which will be output, in accordance with a state of the user who wears the wireless receiver 200. For example, if the user moves rhythmically, the mobile terminal 100 may output music of fast tempo such as dance or hip hop genre, or and if the user is located statically, the mobile terminal 100 may output music of slow tempo such as ballad or classic genre.

To this end, the wireless receiver 200 may sense movement of the user who wears the wireless receiver 200, and may provide the mobile terminal 100 with the sensed information. The mobile terminal 100 that has received the sensed information from the wireless receiver 200 may determine a genre of music which is to be output, based on the sensed information.

According to one embodiment of the present invention, the aforementioned method (operation flow chart) may be implemented in a medium in which a program is recorded, as a code that can be read by a processor. Example of the medium that can be read by a processor include a ROM, a RAM, a CD-ROM, a magnetic tape, a floppy disk, and an optical data storage unit. Also, another example of the recording medium may be implemented in a type of carrier wave (for example, transmission through Internet).

The configurations and method of the aforementioned embodiments are not limited to the mobile terminal 100 and the wireless receiver 200 described as above, and all or some of the respective embodiments may be configured selectively in combination such that various modifications can be made in the embodiments.

INDUSTRIAL APPLICABILITY

The present invention may be applied to a wireless receiver that may receive audio data from a mobile terminal and output the received audio data.

The invention claimed is:

1. A wireless receiver, comprising:
   an earphone;
   an at least two nodes of a SAR (Synthetic Aperture Radar) sensor for sensing whether a user wears the wireless receiver;
   a short-range communication unit for communicating with a mobile terminal; and
   a controller configured to:
   determine a distance of a skin of a human body based on sensitivity with a dielectric sensed by the SAR sensor,
   output feedback in response to reception of event occurrence notification information as the event occurrence notification information is received from the mobile terminal corresponding to an event occurring in the mobile terminal,
   adjust an output intensity of the feedback depending on the distance of the skin of the human body, wherein the feedback includes vibration, and output the intensity of the vibration depending on whether the wireless receiver is directly worn on a skin of the user, and
   swell the earphone to prevent the earphone from coming off from ears of the user in sensing movement of the user who wears the wireless receiver.

2. The wireless receiver according to claim 1, wherein the intensity of the vibration is greater when the user does not wear the wireless receiver than when the user wears the wireless receiver.

3. The wireless receiver according to claim 1, wherein the intensity of the vibration is greater when the wireless receiver is worn on a cloth of the user than when the wireless receiver is directly worn on the skin of the user.

4. The wireless receiver according to claim 1, wherein the feedback includes an audio output, of which the intensity is greater when the user does not wear the wireless receiver than when the user wears the wireless receiver.

5. The wireless receiver according to claim 1, wherein the controller is further configured to control an intensity of the audio output depending on whether the user wears the earphone even though the user wears the wireless receiver.

6. The wireless receiver according to claim 5, wherein the intensity of the audio output is greater when the user does not wear the earphone than when the user wears the earphone.

7. The wireless receiver according to claim 1, wherein the controller is further configured to: control audio data of a multimedia file played by the mobile terminal to be output through the earphone, and control whether to play the multimedia file depending on whether the user wears the earphone.

8. The wireless receiver according to claim 7, wherein the multimedia file is played if the user wears the earphone, and play of the multimedia file is stopped if the user does not wear the earphone.

9. The wireless receiver according to claim 1, further comprising a microphone, wherein the controller is further configured to shrink the earphone if external noise of a predetermined intensity or more is input through the microphone.

10. The wireless receiver according to claim 1, wherein the controller is further configured to control the wireless receiver to tighten on the user if movement of the user who wears the wireless receiver is sensed.

11. The wireless receiver according to claim 1, wherein the controller is further configured to control the wireless receiver to tighten on a neck of the user if the wireless receiver is inclined to any one side on the neck of the user.

12. The wireless receiver according to claim 1, wherein the event includes at least one of i) reception of an incoming call signal, ii) reception of a message, iii) complement of configuration of the wireless communication, and iv) fulfillment of an alarm output condition.

13. A control method of a wireless receiver having an earphone, the control method comprising:
   sensing whether a user wears the wireless receiver via at least two nodes of a SAR (Synthetic Aperture Radar) sensor;
   receiving, via a controller of the wireless receiver, event occurrence notification information from a mobile terminal as an event occurs in the mobile terminal;
   determining a distance of a skin of a human body based on sensitivity with the dielectric sensed by the SAR sensor;
   outputting, via the controller, a feedback in response to reception of the event occurrence notification information;
   adjusting, via the controller, an output intensity of the feedback depending on the distance of the skin of the human body, wherein the feedback includes vibration, and outputting the intensity of the vibration depending on whether the wireless receiver is directly worn on a skin of the user; and
   swelling, via the controller, the earphone to prevent the earphone from coming off from ears of the user in sensing movement of the user who wears the wireless receiver is sensed.

* * * * *